(12) United States Patent
Scheper et al.

(10) Patent No.: US 10,100,878 B2
(45) Date of Patent: Oct. 16, 2018

(54) FLEXIBLE COUPLING ELEMENT

(71) Applicant: SÜDDEUTSCHE GELENKSCHEIBENFABRIK GMBH & CO. KG, Waldkraiburg (DE)

(72) Inventors: Bernd Scheper, Reichertsheim (DE); Marian Kynast, Burghausen (DE); Joachim Reihle, Waldhausen (DE); Marc Brandl, Burgkirchen (DE)

(73) Assignee: SÜDDEUTSCHE GELENKSCHEIBENFABRIK GMBH & CO. KG, Waldkraiburg (DE)

( * ) Notice: Subject to any disclaimer, the term of this patent is extended or adjusted under 35 U.S.C. 154(b) by 149 days.

(21) Appl. No.: 15/021,266

(22) PCT Filed: Sep. 1, 2014

(86) PCT No.: PCT/EP2014/068471
§ 371 (c)(1),
(2) Date: Mar. 10, 2016

(87) PCT Pub. No.: WO2015/036269
PCT Pub. Date: Mar. 19, 2015

(65) Prior Publication Data
US 2016/0223029 A1    Aug. 4, 2016

(30) Foreign Application Priority Data

Sep. 12, 2013   (DE) .................... 20 2013 008 117 U

(51) Int. Cl.
*F16D 3/62*   (2006.01)
*F16D 3/78*   (2006.01)

(52) U.S. Cl.
CPC .... *F16D 3/78* (2013.01); *F16D 3/62* (2013.01)

(58) Field of Classification Search
CPC ..................................... F16D 3/62; F16D 3/78
(Continued)

(56) References Cited

U.S. PATENT DOCUMENTS

| 1,114,326 A | 10/1914 | Allen |
| 1,424,051 A | 7/1922 | Wayne |

(Continued)

FOREIGN PATENT DOCUMENTS

| CH | 321633 | * 6/1957 | ...................... 464/69 |
| DE | 4304274 C1 | 3/1994 | |

(Continued)

*Primary Examiner* — Greg Binda
(74) *Attorney, Agent, or Firm* — Moore & Van Allen PLLC; Henry B. Ward, III

(57) ABSTRACT

A flexible coupling element for a shaft arrangement for articulated connection of two shaft sections. The flexible coupling element has a plurality of bushings, at least one primary loop bundle a support arrangement arranged on at least one bushing for axial guidance of the at least one primary loop bundle, and an elastic cover. The at least one primary loop bundle, the at least one support arrangement and the plurality of bushings are embedded at least partially in the elastic cover. With this flexible coupling element, it is also provided that the at least one primary loop bundle is wrapped around two neighboring bushing pair Neighboring bushing pairs are joined together by means of at least one secondary loop bundle which is secured separately on the at least one support arrangement.

14 Claims, 42 Drawing Sheets

(58) Field of Classification Search
USPC .................................................. 464/69, 93
See application file for complete search history.

(56) References Cited

U.S. PATENT DOCUMENTS

| | | | |
|---|---|---|---|
| 2,073,852 A | | 3/1937 | Radford |
| 3,362,252 A | | 1/1968 | Ditlinger |
| 4,031,714 A | | 6/1977 | Faust |
| 5,562,545 A | * | 10/1996 | Wahling .................... F16D 3/78 |
| | | | 464/93 |
| 8,834,280 B2 | * | 9/2014 | Scheper .................... F16D 3/78 |
| | | | 464/69 |
| 2011/0300953 A1 | | 12/2011 | Waehling et al. |

FOREIGN PATENT DOCUMENTS

| | | |
|---|---|---|
| DE | 102008047596 A1 | 3/2010 |
| DE | 102011013332 A1 | 9/2012 |
| DE | 102011121470 A1 | 6/2013 |
| GB | 917680 A | 2/1963 |
| WO | 2010037538 A1 | 4/2010 |

* cited by examiner

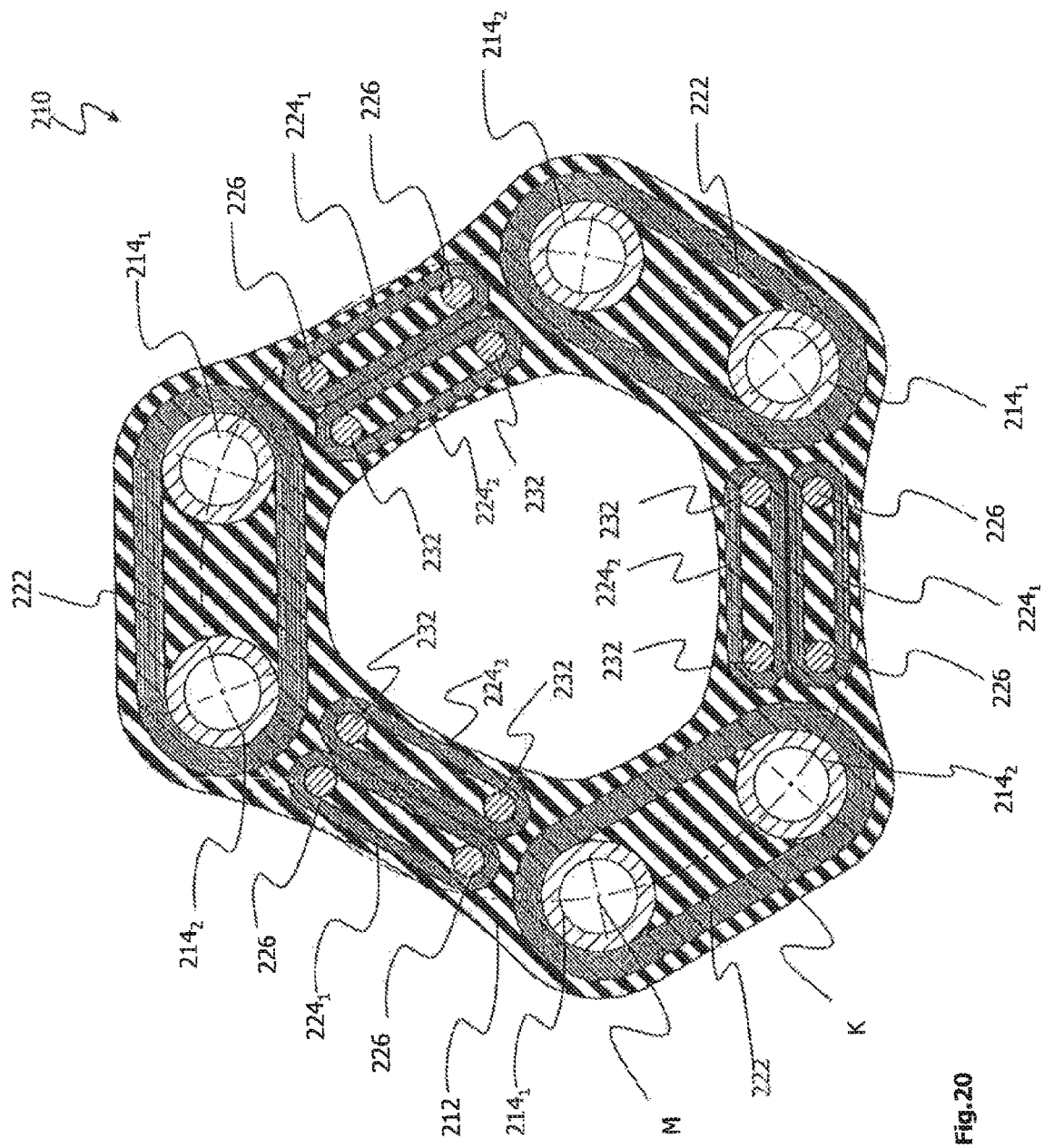

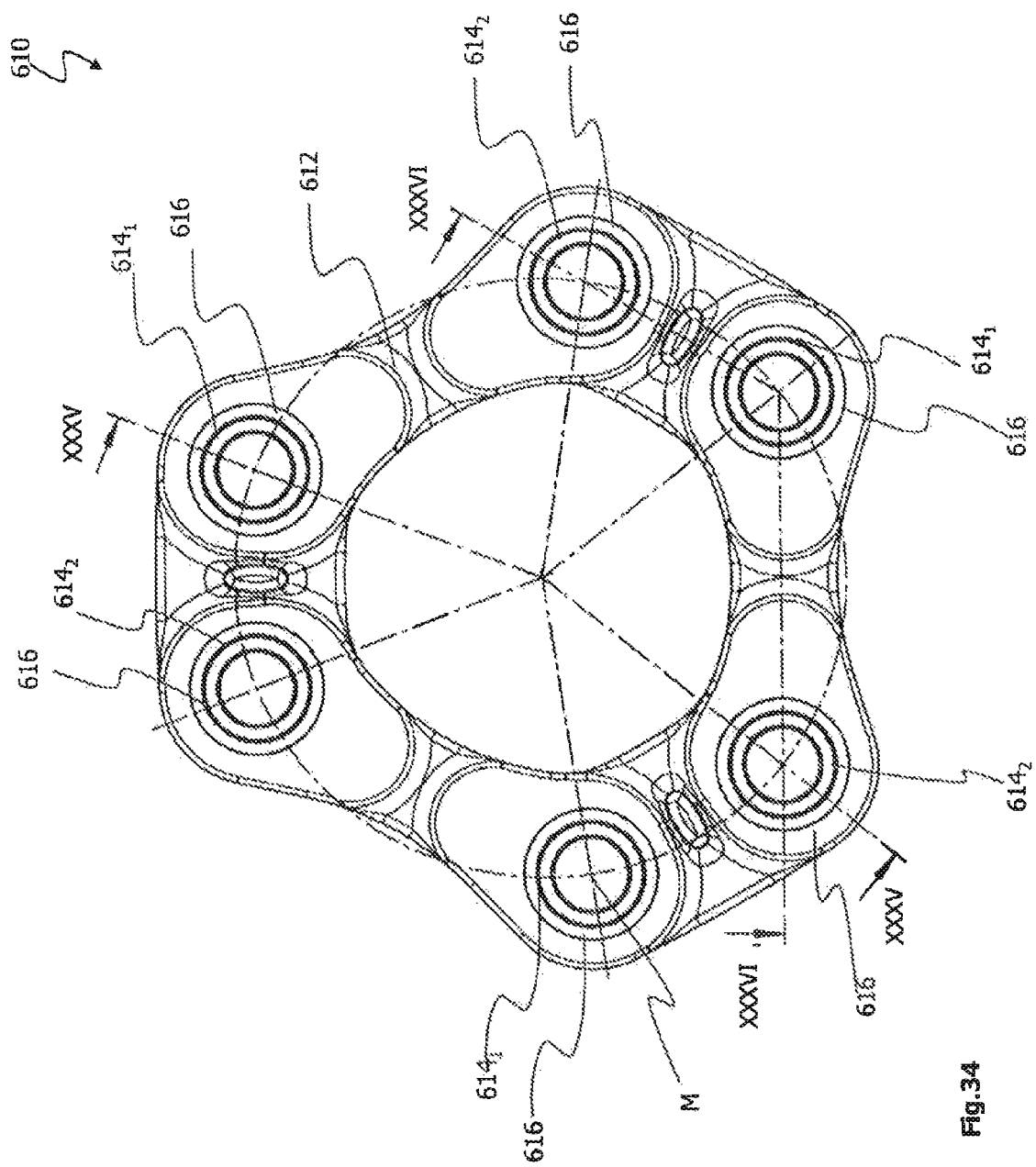

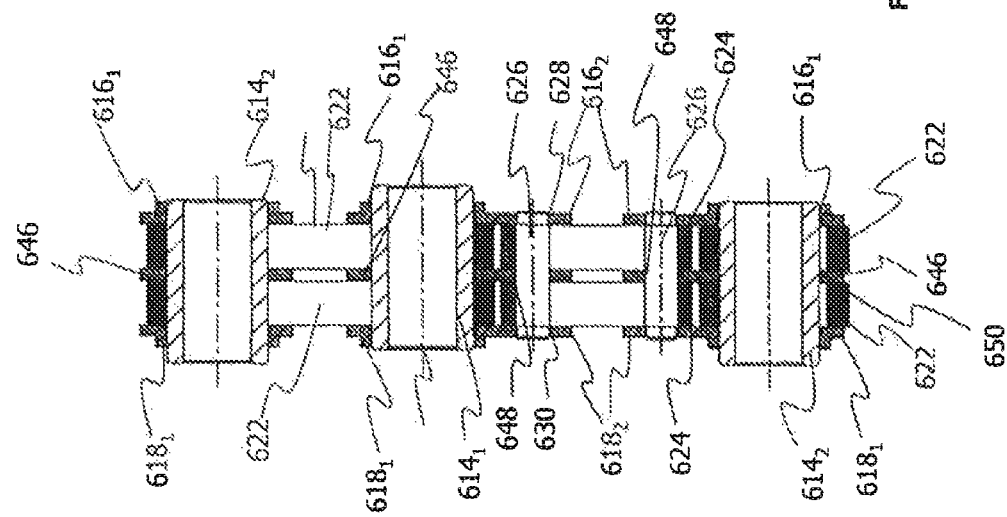
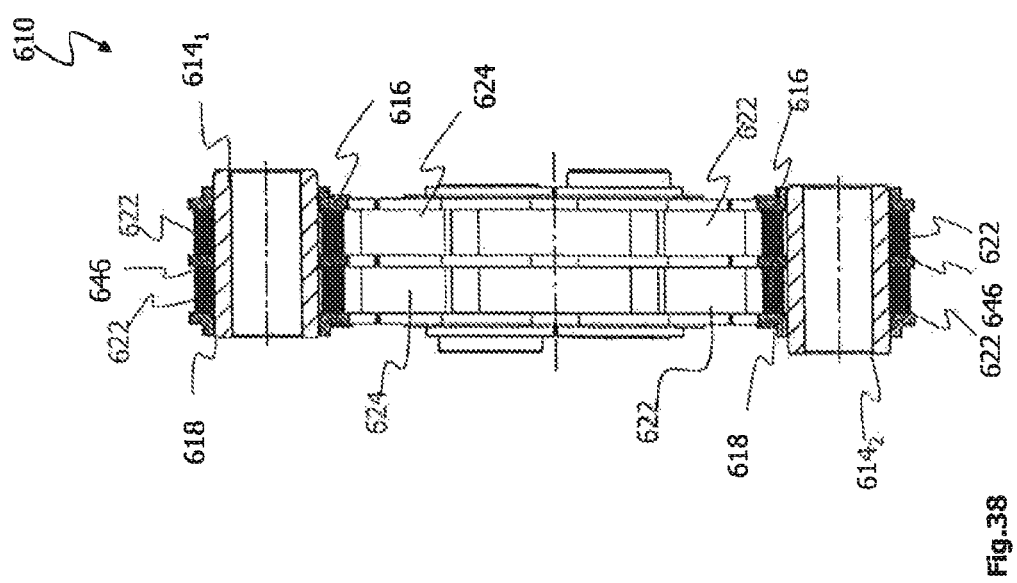

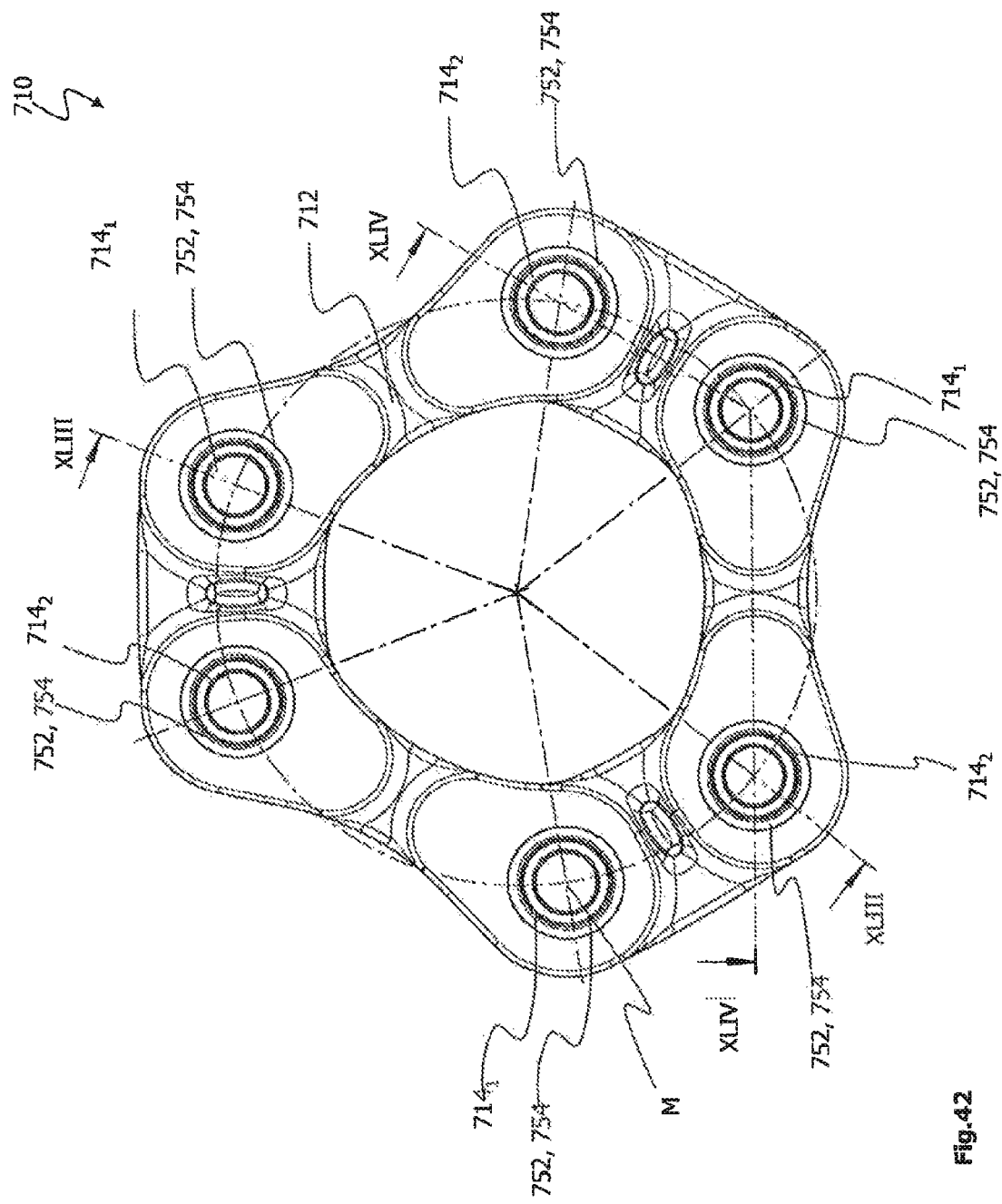

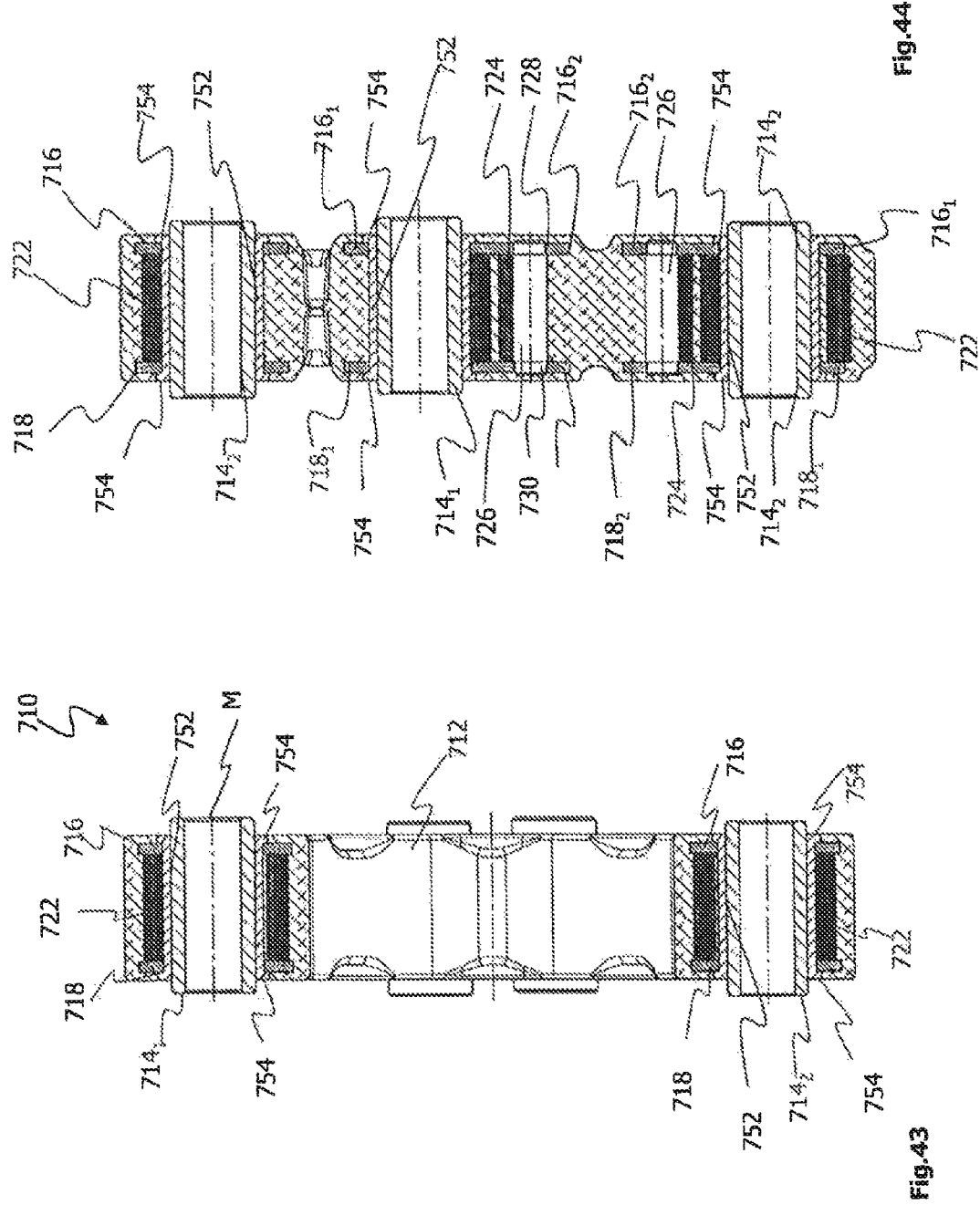

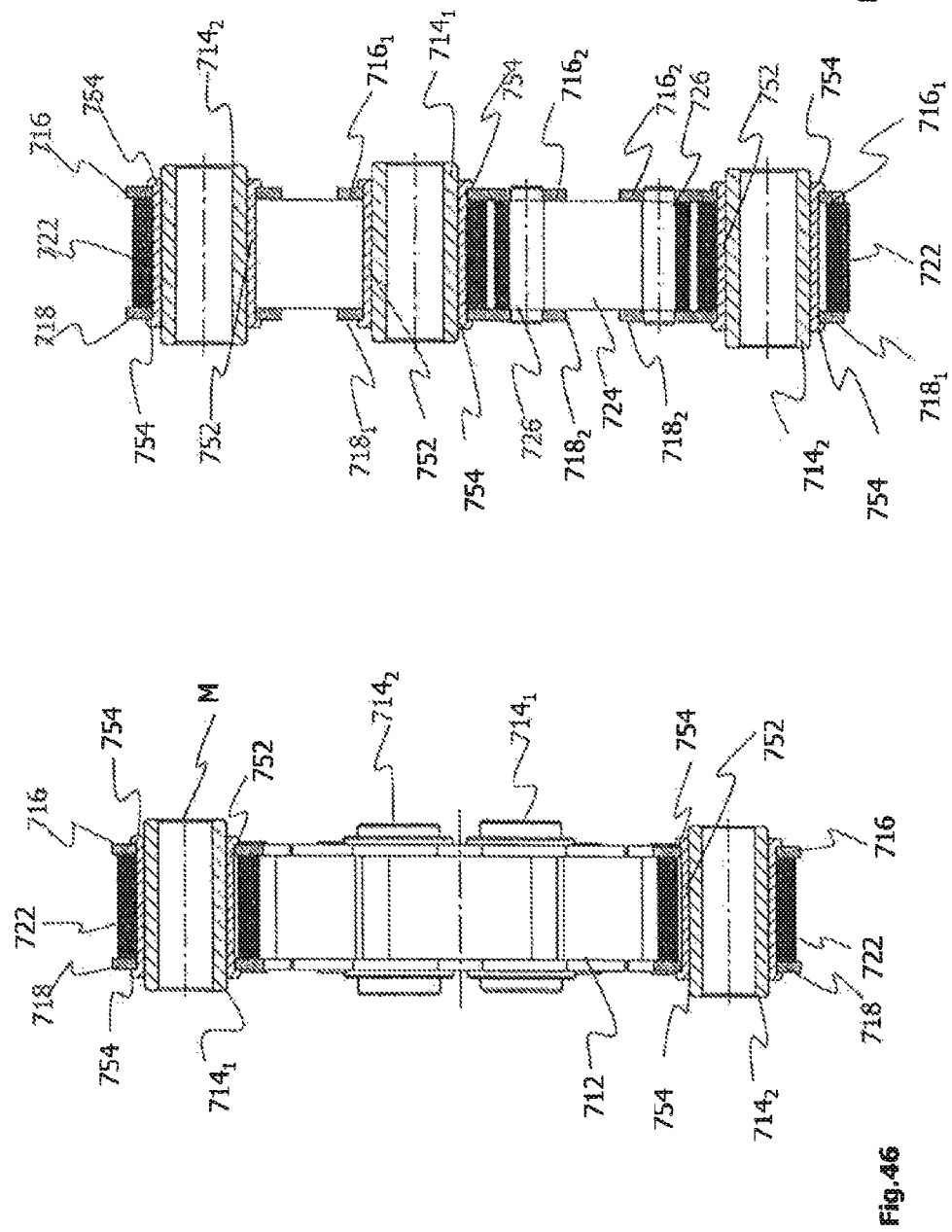

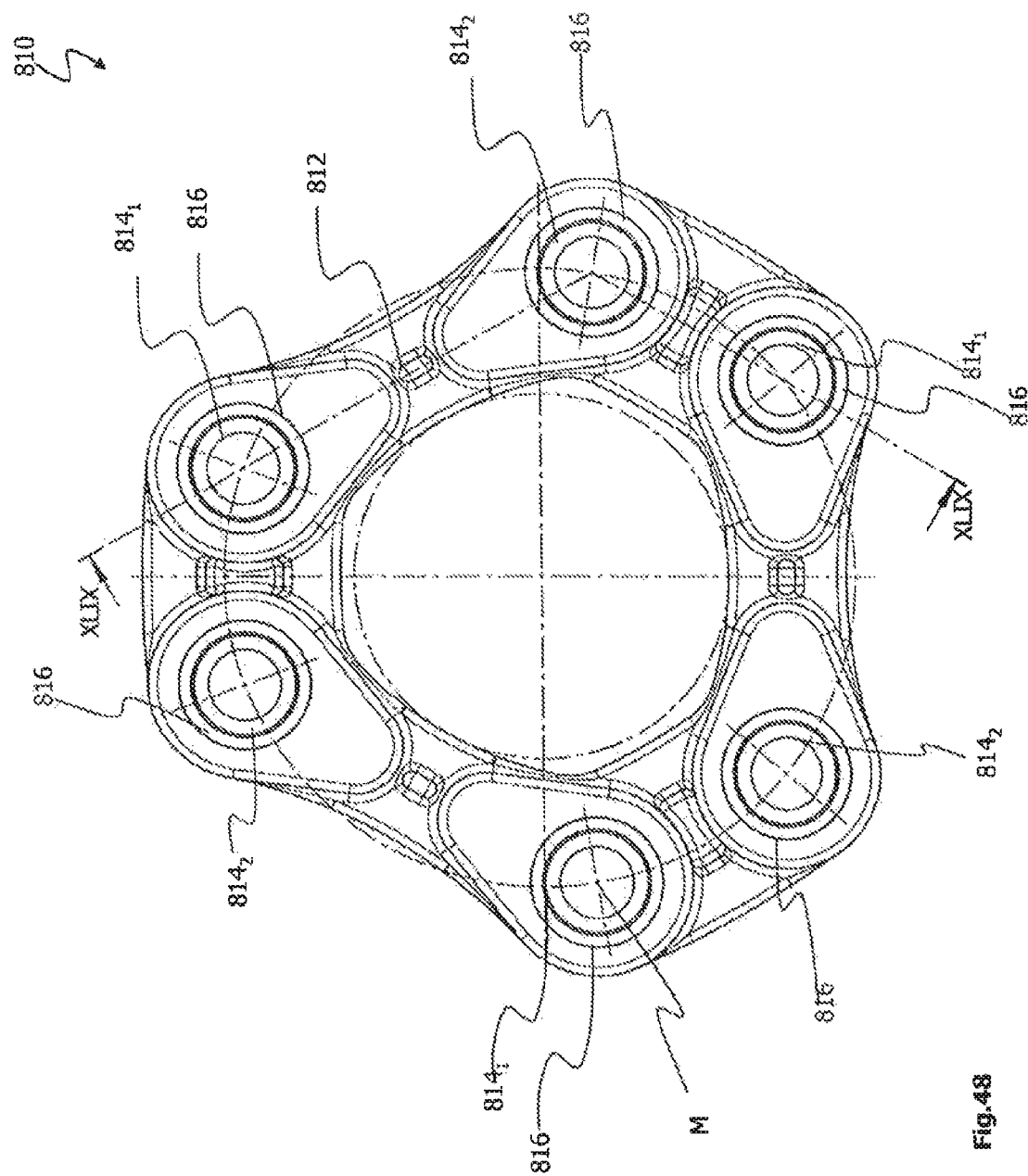

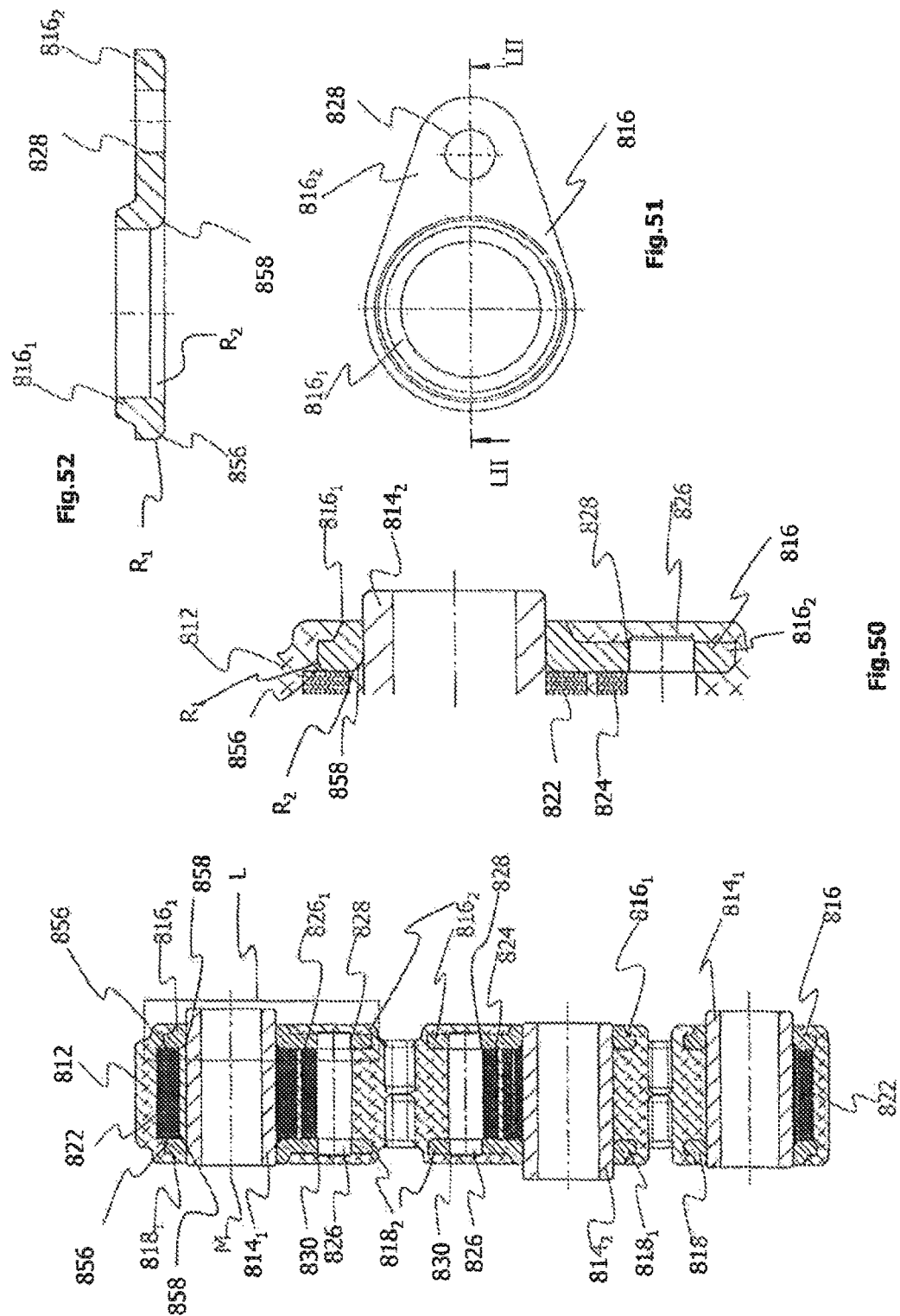

FLEXIBLE COUPLING ELEMENT

FIELD OF THE INVENTION

The present invention relates to a flexible coupling element for a shaft arrangement for flexibly connecting two shaft segments. The elastic coupling element has a plurality of bushings, at least one primary loop bundle, a support arrangement provided for axially guiding the at least one primary loop bundle on at least one bushing and an elastic cover into which the at least one primary loop bundle, the at least one support arrangement and the plurality of bushings are embedded at least partially.

BACKGROUND OF THE INVENTION

Such elastic coupling elements are already known from the prior art. In this context, there is also talk of a coupling disk, such as that used in a drive train of a motor vehicle to connect two shaft segments for transmitting a torque. Such coupling disks and/or coupling elements have the advantage that they are capable of effectively compensating cardan movements of the two shaft segments relative to one another with good torque transmitting properties and a long lifetime and effectively compensating an axial offset between the shaft segments, up to a certain extent, with damping of rotational vibrations.

The document DE 10 2008 047 596 A1 discloses one such coupling disk known from the prior art, comprising a plurality of bushings arranged at predetermined angular distances in the circumferential direction with respect to a central axis M of the coupling element. A plurality of loop bundles are provided with this coupling disk, each loop bundle wrapping around two neighboring bushings and each bushing being wrapped by at least two loop bundles, one of which can be subjected to tensile loading over the shaft segments in the case of torque transmission and the other of which can be subjected to shearing load. For axial guidance of the plurality of loop bundles, a support arrangement is provided on one bushing. The loop bundles, the support arrangements and the bushings are embedded in a flexible rubber cover.

Furthermore, coupling elements of the type disclosed in the document DE 10 2011 013 332 A1 are known from the prior art. The coupling element described in this document comprises a loop bundle, which is wrapped around a pair of bushings comprised of two neighboring bushings. At least one support arrangement is provided to guide the loop bundle on at least one bushing. Neighboring bushings are additionally interlinked in a force transmitting manner by means of an additional loop bundle.

Although the known coupling disks and/or coupling elements have already been largely optimized with regard to their lifetime and the maximum torques that can be transmitted in continuous operation, there is still a need to reduce the installation space required for such coupling elements with at least uniform, maximally transmissible torques. In particular in the case of automotive drive trains, very little installation space is available for connecting the transmission output shaft to another shaft segment of the drive train, for example.

SUMMARY OF THE INVENTION

One object of the present invention is to provide a coupling element of the type defined in the introduction, which is capable of transmitting higher torques with a reduced need for installation space.

This object is achieved by a flexible coupling element having the features of the present invention.

Additional embodiments of the invention are expressed in the accompanying dependent claims.

With the elastic coupling element according to the invention, the at least one primary loop bundle is wrapped around two neighboring bushings to form a bushing pair. The neighboring bushing pairs wrapped by a primary loop bundle are linked together by at least one secondary loop bundle, which is fastened separately to the at least one support arrangement.

A primary loop bundle is wrapped around two neighboring bushings to form a bushing pair, as explained above. A secondary loop bundle is to be understood in this context as a loop bundle extending between the support arrangements of two neighboring bushing pairs and/or bushings but not wrapping around the bushings, i.e., a secondary loop bundle extends completely between the bushings in one region.

A loop bundle is formed by a plurality of windings of a continuous loop or a plurality of loops. A loop bundle may be designed in the form of a strap.

The elastic cover may be made of a rubber, an elastomer, a thermoplastic elastomer or a silicone.

The coupling element according to the present invention needs less installation space due to the joining of the bushing pairs with a primary loop bundle wrapped around them by means of a secondary loop bundle, which is fastened to the support arrangements. This is true in particular of the installation space in the axial direction of the bushings. Since the coupling element according to the invention needs less space due to its design, i.e., it is designed as a smaller element, less material accordingly is also needed to form the flexible rubber cover into which the loop bundles, the bushings and the support arrangements are embedded. Less need for material for the flexible rubber cover is equivalent to lower costs for production and/or the material.

Due to the reduced dimensions of the coupling element according to the invention in the axial direction of the bushings in comparison with the prior art, the self-aligning torque in bending loads is reduced. A reduction in the self-aligning torque in bending loads, on the one hand, leads in turn to a reduction in the load on adjacent components and, on the other hand, to a better vibrational separation between the shaft segments to be connected in bending vibrations.

Due to the separate arrangement the at least one primary loop bundle and the at least one secondary loop bundle, the at least one primary loop bundle and the at least one secondary loop bundle cannot have any negative effects on one another during operation of the coupling element. Since the at least primary loop bundle and the at least one secondary loop bundle do not have any touch points or contact points in the axial direction of the bushings during operation, unlike the prior art, the aforementioned mutual negative effects can be ruled out in particular in the axial direction of the loop bundles but also under cardan loads. This also leads to a more homogeneous application of force into the loop bundles. A homogeneous application of force results in an improved long lifetime and also an increased torque transmitting capacity.

According to one embodiment of the invention, the at least one primary loop bundle and the at least one secondary loop bundle may be arranged so that they alternate in the circumferential direction of the coupling element.

In this context, it should also be pointed out that at least one primary loop bundle and the at least one secondary loop bundle may be in alignment in the radial direction of the coupling element. Since all the loop bundles can be aligned with the coupling element according to the invention, the coupling element needs relatively less installation space in the axial direction of the bushings in comparison with the prior art.

According to a refinement of the invention, the at least one support arrangement may have at least one fastening means for fastening the at least one secondary loop bundle on the support arrangement. As already explained, a secondary loop bundle does not wrap around the bushings but instead is attached by at least one fastening means to the support arrangements on the bushings.

At least one support arrangement may have at least one flange element. At least one flange element may preferably be arranged on one of the axial ends of one of the bushings and may serve as axial guidance for the primary loop bundle.

According to one embodiment of the invention, at least one fastening means may be connected to the at least one flange element. The flange elements may be shaped like a flange, i.e., with a section in contact with the bushings and with a flange section, designed in a disk shape or otherwise, as long as their guidance of the loop bundles can be ensured.

At least one support arrangement may have one flange element on each of the axial ends of the bushings according to one refinement of the invention. It is possible to provide for the flange elements to enclose between them both the cross section of the at least one primary loop bundle and the cross section of the at least one secondary loop bundle on each of the axial ends of the bushings. In other words, the cross sections in the axial direction of the bushings of the at least one primary loop bundle and the at least one secondary loop bundle are coordinated with one another so that the flange elements on each of the axial ends of the bushings can enclose the cross section of the primary loop bundle and the cross section of the secondary loop bundle between them in the axial direction of the bushings.

According to a refinement of the invention, the flange elements may be in contact with the at least one primary loop bundle, which is wrapped around a bushing pair at the axial ends of the bushings in the wrap region of the bushings. The wrap region is the region of the bushing in which the primary loop bundle surrounds the bushing radially in some section. In the wrap region, the primary loop bundle may also be in contact with the bushing.

At least one secondary loop bundle may be fastened to the flange elements by at least one fastening means. The flange elements may be in contact with the at least one secondary loop bundle in at least some sections.

As already explained above, the at least one secondary loop bundle does not wrap around the bushings but instead extends completely between the bushings in the flexible rubber cover.

However, according to one embodiment of the invention, the at least one secondary loop bundle can wrap around the at least one fastening means from the neighboring support arrangement.

According to a refinement of the invention, the at least one flange element may have at least one receiving section to receive the bushing and a fastening section to fasten the at least one secondary loop bundle by means of the at least one fastening means.

The at least one fastening means for fastening a secondary loop bundle may preferably be a bolt, which is held in an opening in at least one flange element. The receptacle may be implemented in a force-locking and form-fitting manner. The bolts may have an oval, round or semicircular cross section or some other type of cross section.

According to one embodiment of the invention, a primary loop bundle may wrap around two neighboring bushings to form a bushing pair. The bushing pairs wrapped by a primary loop bundle may be interconnected via a secondary loop bundle.

According to one refinement of the invention, it is possible to provide that no primary loop bundle extends between the bushing pairs connected by the at least one primary loop bundle.

According to one embodiment of the invention, the bushings wrapped by a primary loop bundle to form a bushing pair may be offset relative to one another by a predetermined first angle. The bushings of bushing pairs formed in this way may also be offset relative to one another by a predetermined second angle. The first angle may—but need not necessarily—differ from the second angle. The first and second angles may be selected from a range between 15° and 180°. The angle is preferably determined around the midpoint of a circle extending through the central axes of the bushings and between the central axes of the bushings.

According to one embodiment, the at least one support arrangement may have at least one intermediate element. At least the primary loop bundles wrapped around a bushing can be separated from one another by the at least one intermediate element. It is conceivable for neighboring bushings to each be wrapped by two or more primary loop bundles to form a bushing pair. At least one intermediate element can also separate neighboring secondary loop bundles from one another in at least some sections.

The at least one intermediate element may be connected by the at least one fastening element to the at least one flange element.

The bushings may also be held in outer bushings in some sections. The at least one support arrangement may be connected to at least one outer bushing. The at least one outer bushing may be subject to plastic deformation to establish a connection to the at least one support arrangement.

The present invention also relates to a shaft arrangement, in particular an automotive drive train with a coupling element having the features described above.

BRIEF DESCRIPTION OF THE SEVERAL VIEWS OF THE DRAWINGS

Exemplary embodiments of the invention are described below with respect to the accompanying figures, in which

FIG. 20 shows a sectional view of the coupling element according to the third embodiment of the invention;

FIG. 34 shows a top view of the coupling element according to the seventh embodiment of the invention;

FIG. 38 shows a sectional view along the sectional line XXXVIII-XXXVIII in FIG. 37;

FIG. 39 shows a sectional view along the sectional line XXXIX-XXXIX in FIG. 37;

FIG. 42 shows a top view of the coupling element according to the eighth embodiment of the invention;

FIG. 43 shows a sectional view along the sectional line XLIII-XLIII in FIG. 42;

FIG. 44 shows a sectional view along the sectional line XLIV-XLIV in FIG. 42;

FIG. 46 shows a sectional view along the sectional line XLVI-XLVI in FIG. 45;

FIG. 47 shows a sectional view along the sectional line XLVII-XLVII in FIG. 45;

FIG. 48 shows a top view of a flexible coupling element according to the ninth embodiment of the invention;

FIG. 49 shows a sectional view along the sectional line XLIX-XLIX in FIG. 48;

FIG. 50 shows an enlarged detail view of a detail L in FIG. 49;

FIG. 51 shows a top view of a flange element according to the ninth embodiment; and FIG. 52 shows a sectional view along the sectional line LII-LII in FIG. 51.

DETAILED DESCRIPTION OF THE INVENTION

Figure 1:
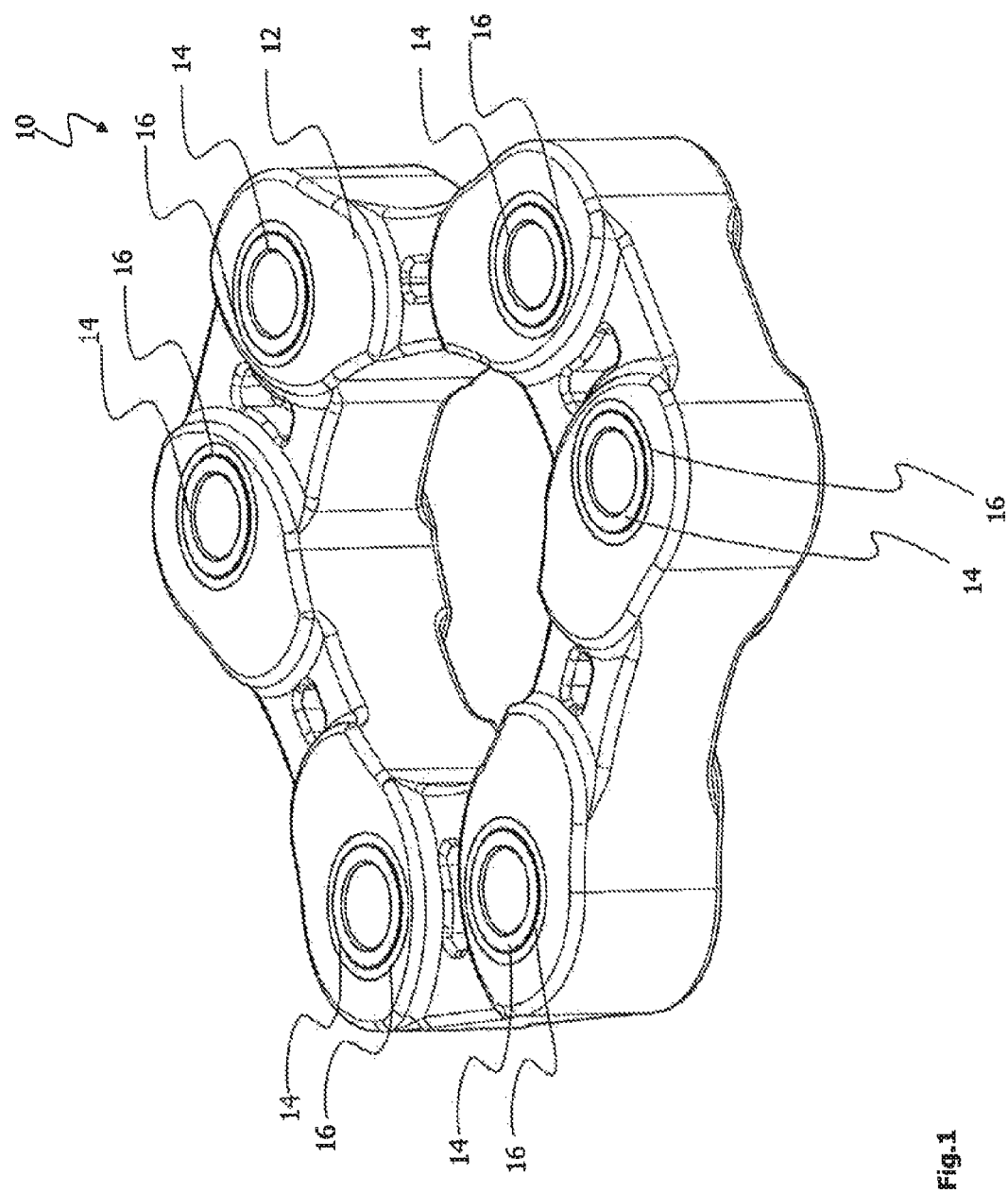
FIG. 1 shows a perspective view of a coupling element according to a first embodiment of the invention.

FIG. 1 shows a perspective view of the coupling element according to a first embodiment of the invention, labeled as 10 in general.

The coupling element 10 is a coupling disk.

The coupling element 10 has a flexible rubber cover 12, in which a plurality of bushings 14 and a plurality of flange elements 16 arranged on the bushings 14 are embedded in at least some sections. The flange elements 16 are part of a support arrangement, which is not shown completely in FIG. 1, for axial guidance of loop bundles (not shown).

Figure 2:
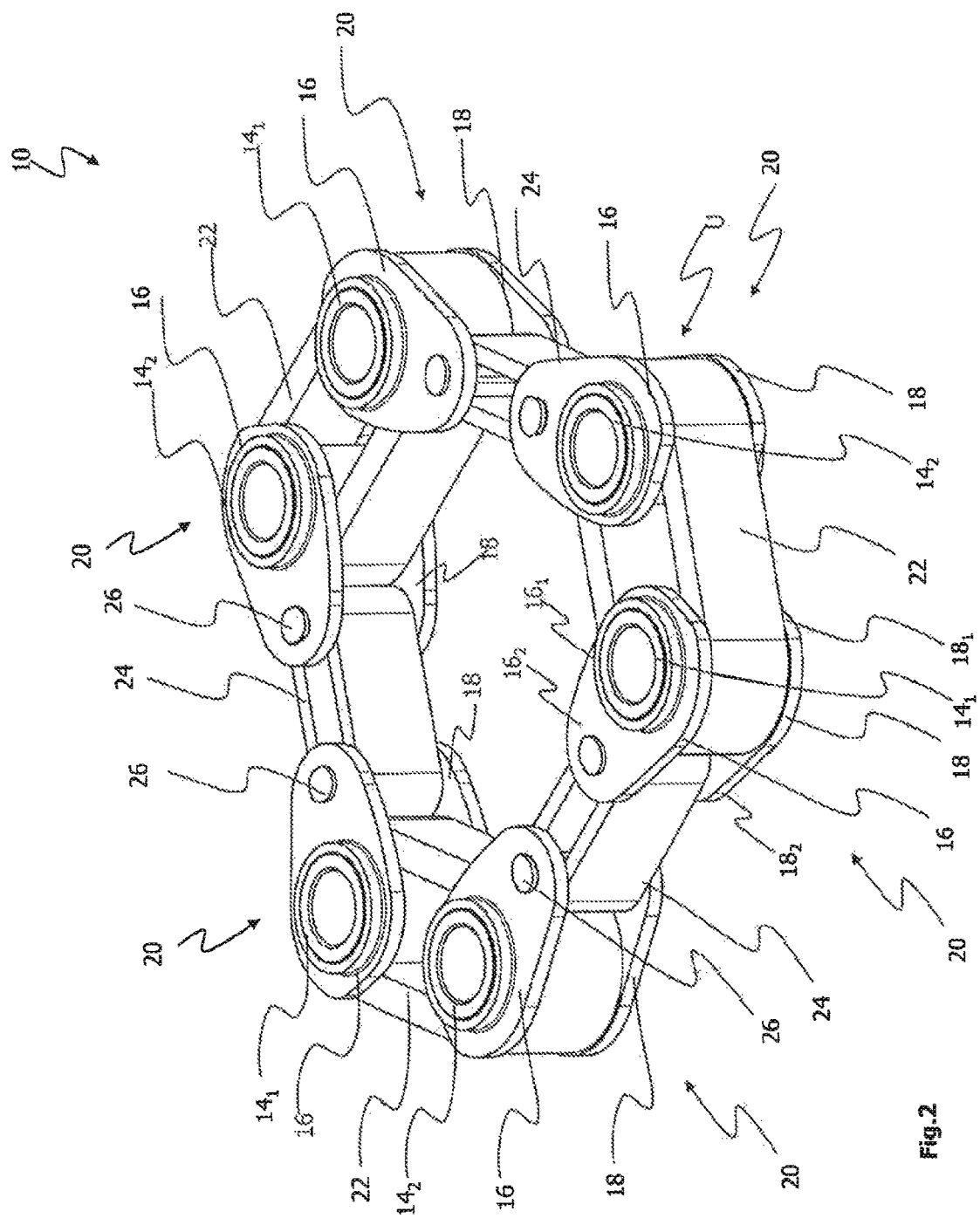
FIG. 2 shows a perspective view of the basic element of the elastic coupling element according to FIG. 1.

FIG. 2 shows a perspective view of the basic element of the coupling element 10.

FIG. 2 shows the support arrangement 20, comprising the flange elements 16 and 18. The flange elements 16 and 18 are provided on the axial ends of the bushings 14. The support arrangement 20 serves to provide axial guidance of the primary loop bundles 22 on the bushings 14 and/or in the wrap region U. The primary loop bundles 22 are wrapped around two neighboring bushings $14_1$ and $14_2$ to form bushing pairs $14_1$, $14_2$. The secondary loop bundles 24 extend between the bushing pairs $14_1$ and $14_2$ that are wrapped by the primary loop bundles 22 and are secured on the flange elements 16 and 18 of the support arrangement 20 of fastening means and/or bolts 26. The secondary loop bundles 24 are therefore not wrapped around the bushings 14 but instead are secured on the flange elements 16 and 18 by means of the bolts 26. The secondary loop bundles 24 are wrapped around the bolts 26 of two neighboring support arrangements 20.

The flange elements 16 and 18 have a receiving section $16_1$, $18_1$ and a fastening section $16_2$, $18_2$. The receiving sections $16_1$ and $18_1$ serve to receive the bushings 14 and for axial guidance of the primary loop bundles 22 on the bushings $14_1$ and $14_2$. The fastening sections $16_2$ and $18_2$ serve to fasten the secondary loop bundles 24 on the support arrangements 20 by means of the bolts 26.

Figure 3:
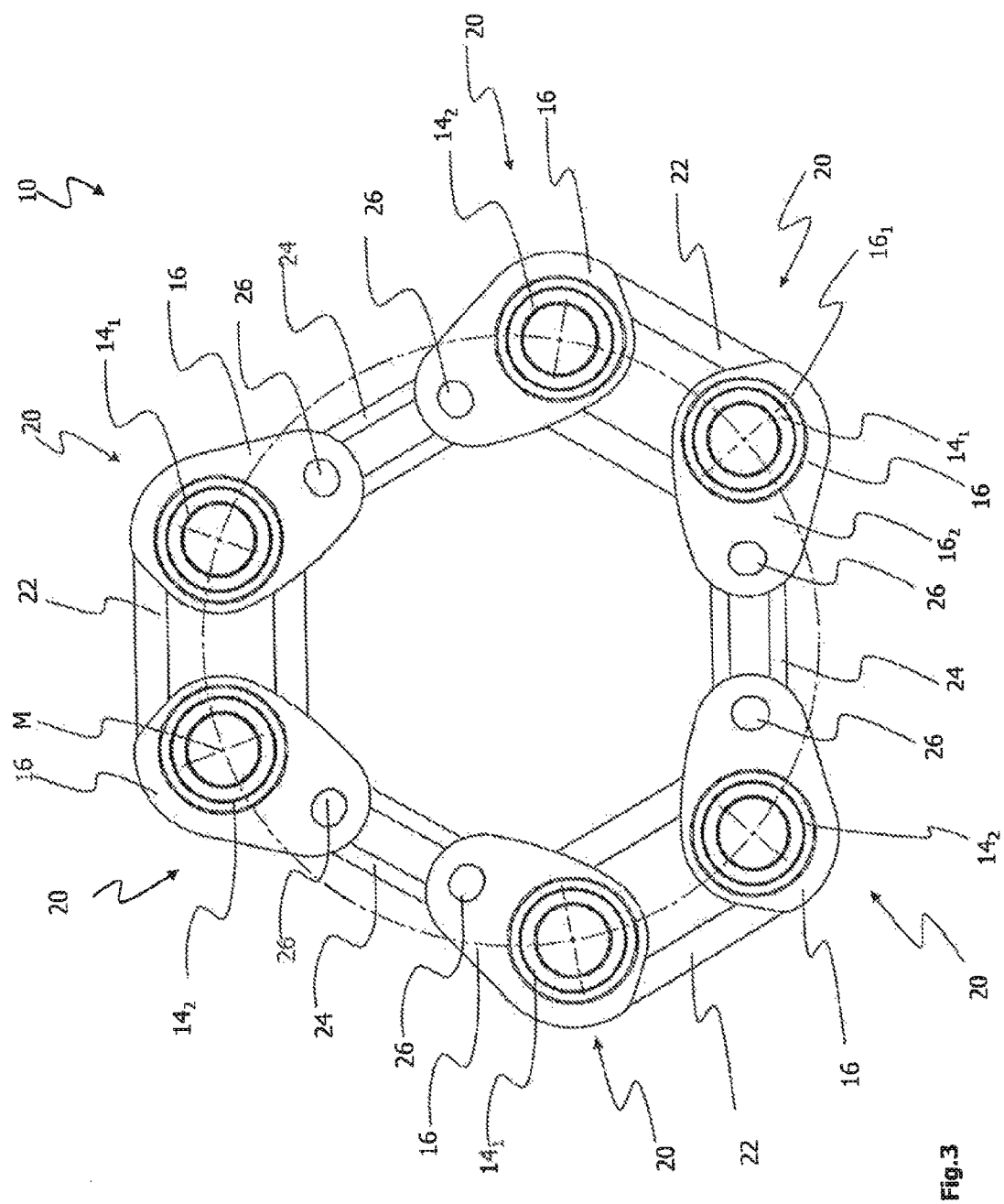
FIG. 3 shows a top view of the basic element according to FIG. 2.

FIG. 3 shows a top view of the basic element of the elastic coupling element 10.

FIG. 3 shows clearly the alternating arrangement of the primary loop bundles 22 and the secondary loop bundles 24 in the circumferential direction of the coupling element 10. The bushing pairs $14_1$ and $14_2$, which are wrapped by the primary loop bundles 22, are connected by the secondary loop bundles 24 mounted on the flange element 16, 18 and/or the support arrangements 20 by means of the bolts 26.

As can be seen in FIG. 3, all the bushings 14 and/or their axes M lie on a radius.

Figure 4:
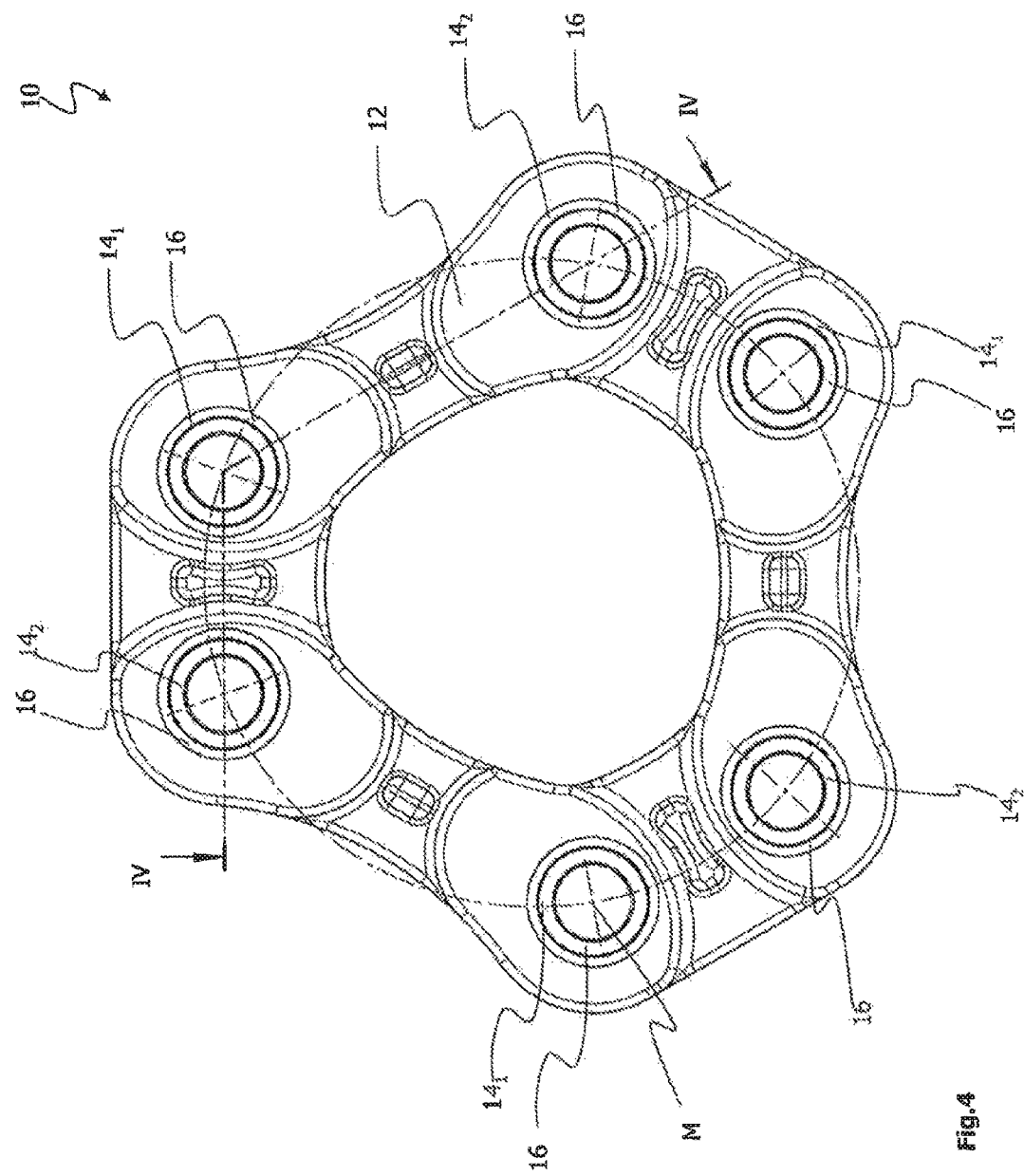
FIG. 4 shows a top view of the coupling element according to FIG. 1.

FIG. 4 shows a top view of the coupling element 10, in which the flexible rubber cover 12, the bushings 14 and the flange elements 16 arranged on the bushings 14 can be discerned.

Figure 5:
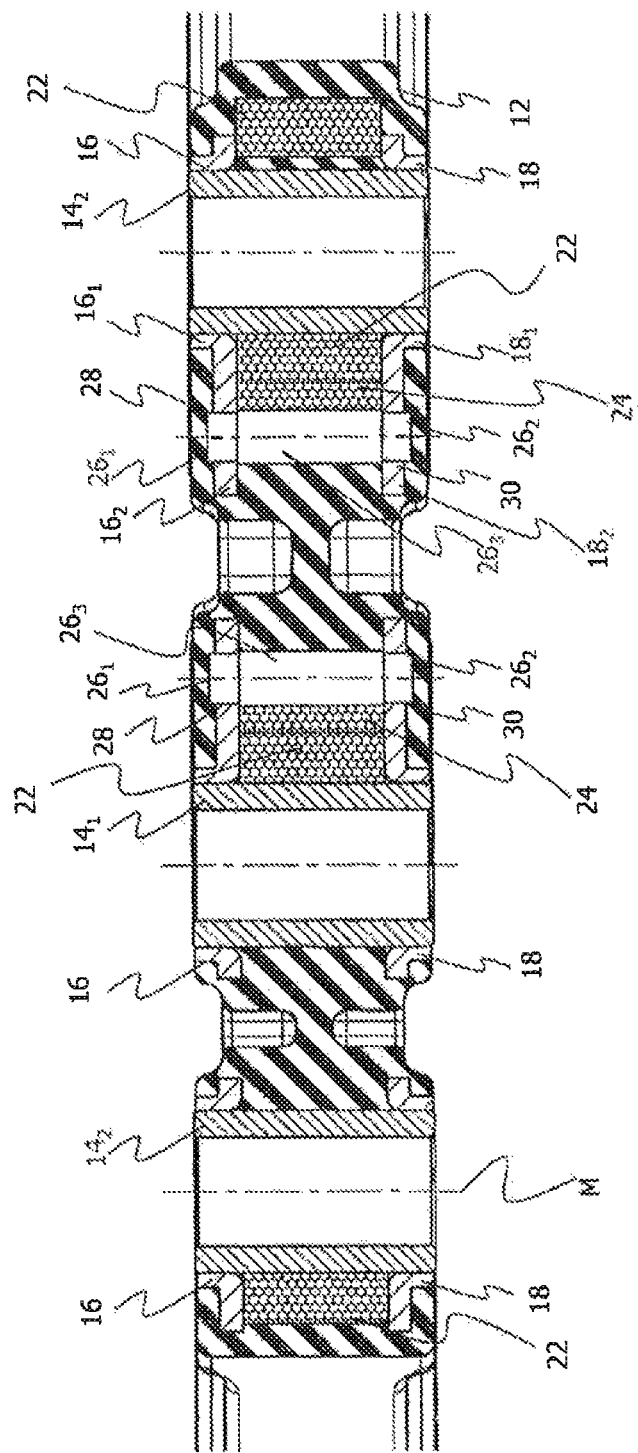
FIG. 5 shows a sectional view along the sectional line IV-IV from FIG. 4.

FIG. 5 shows a sectional view along the sectional line IV-IV in FIG. 4;

The bushing pair $14_1$ and $14_2$ is wrapped by a primary loop bundle 22, which is guided axially over the flange elements 16 and 18 onto the bushings $14_1$ and $14_2$. The secondary loop bundle 24, which extends between the support arrangements 20 on the bushings $14_2$ and $14_1$, is around the bolts 26, which are held in an opening 28 of the flange element 16 and in an opening 30 of the flange element 18.

Openings 28, 30 are formed in the fastening section $16_2$ and $18_2$ of flange elements 16 and 18. The bolt 26 is designed with steps and has a smaller diameter on each of its ends $26_1$ and $26_2$ than in its central section $26_3$. The ends $26_1$ and $26_2$ of the bolt 26 are held in the openings 28 and 30 of the flange elements 16 and 18, wherein the flange elements 16, 18 are in contact with the diameter steps in the axial direction and are supported on them. The spacing of the flange elements 16, 18 is therefore predetermined. The primary loop bundles 22 and the secondary loop bundles 24 are connected to one another in the circumferential direction of the coupler 10. It is possible for the primary loop bundles 22 and the secondary loop bundles 24 to come in contact or for them to be arranged at a distance form one another.

FIG. 5 shows clearly that the primary loop bundles 22 and the secondary loop bundles 24 have the same cross section in the axial direction of the bushings 14. The flange elements 16 and 18 thus enclose both the cross section of the primary loop bundle 22 and the cross section of the secondary loop bundle 24 between them, i.e., the flange elements 16 and 18 are in contact with the primary loop bundle 22 as well as with the secondary loop bundle 24.

The bushings 14, the flange elements 16, 18, the primary loop bundles 22 and the secondary loop bundles 24 as well as the bushings 26 are all embedded in the flexible rubber cover 12.

Figure 6:
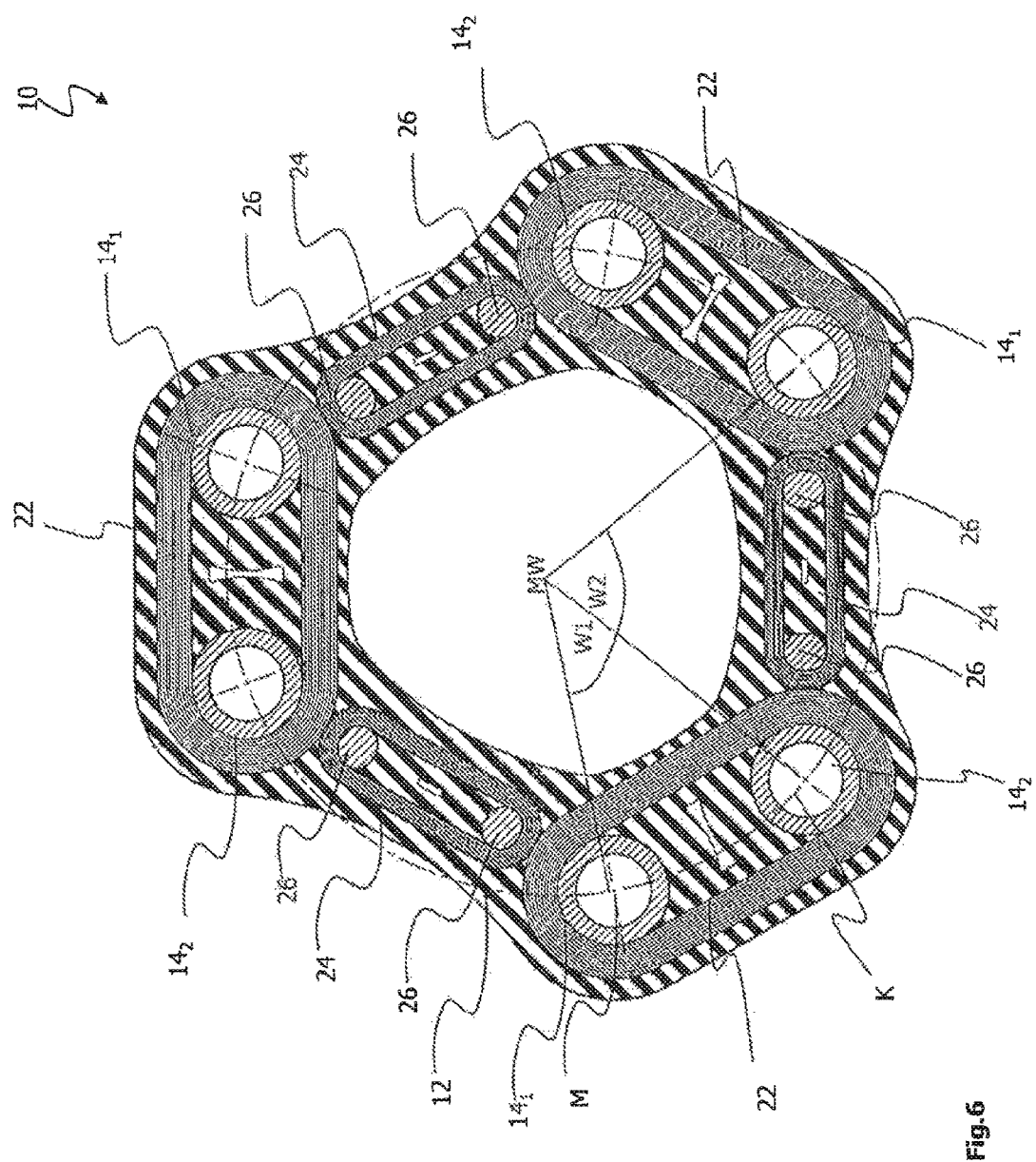
FIG. 6 shows a sectional view of the coupling element according to the first embodiment of the invention.

FIG. 6 shows a sectional view of the coupling element 10.

The primary loop bundles 22 are wrapped around the bushing pairs $14_1$ and $14_2$ to form three bushing pairs $14_1$, $14_2$. The secondary loop bundles 24 are wrapped around the bolts 26 of support arrangements 20 on the bushings $14_1$ and $14_2$ in order to couple the three neighboring bushing pairs $14_1$, $14_2$ to one another. The primary loop bundles 22 and the secondary loop bundles 24 are provided in alternation in the flexible rubber cover 12.

The secondary loop bundles 24 are designed to be much smaller in comparison with the primary loop bundles 22. The primary loop bundles 22 are preferably used for a tensile segment, i.e., the primary loop bundles 22 are exposed mainly to tensile forces during operation of the coupling element 10 whereas the secondary loop bundle 24 are subject to compressive forces and/or lower tensile forces. The secondary loop bundles 24 serve to stabilize the coupling disk but are under less load during use and therefore can be designed to be weaker than the primary loop bundle.

FIG. 6 shows that the bushings $14_1$ and $14_2$, which are connected by means of the primary loop bundle 22 to form a bushing pair $14_1$, $14_2$, are offset relative to one another by a predetermined first angle W1. The bushings $14_1$ and $14_2$ of the individual bushing pairs $14_1$, $14_2$ formed by primary loop bundles 22 are also arranged so they are offset relative to one another by a predetermined second angle W2. The predetermined first angle W1 can differ from the predetermined second angle W2. However, this need not necessarily be the case. The angles W1 and W2 are preferably defined about a midpoint MW of a circle K extending through the central axes M of the $14_1$, $14_2$ and defined between the central axes M of the bushings $14_1$, $14_2$.

A further embodiment of the coupling element according to the invention is described below. Similar features and those having the same effect are provided with the same reference numerals as in the first embodiment but preceded by another digit.

Figure 7:
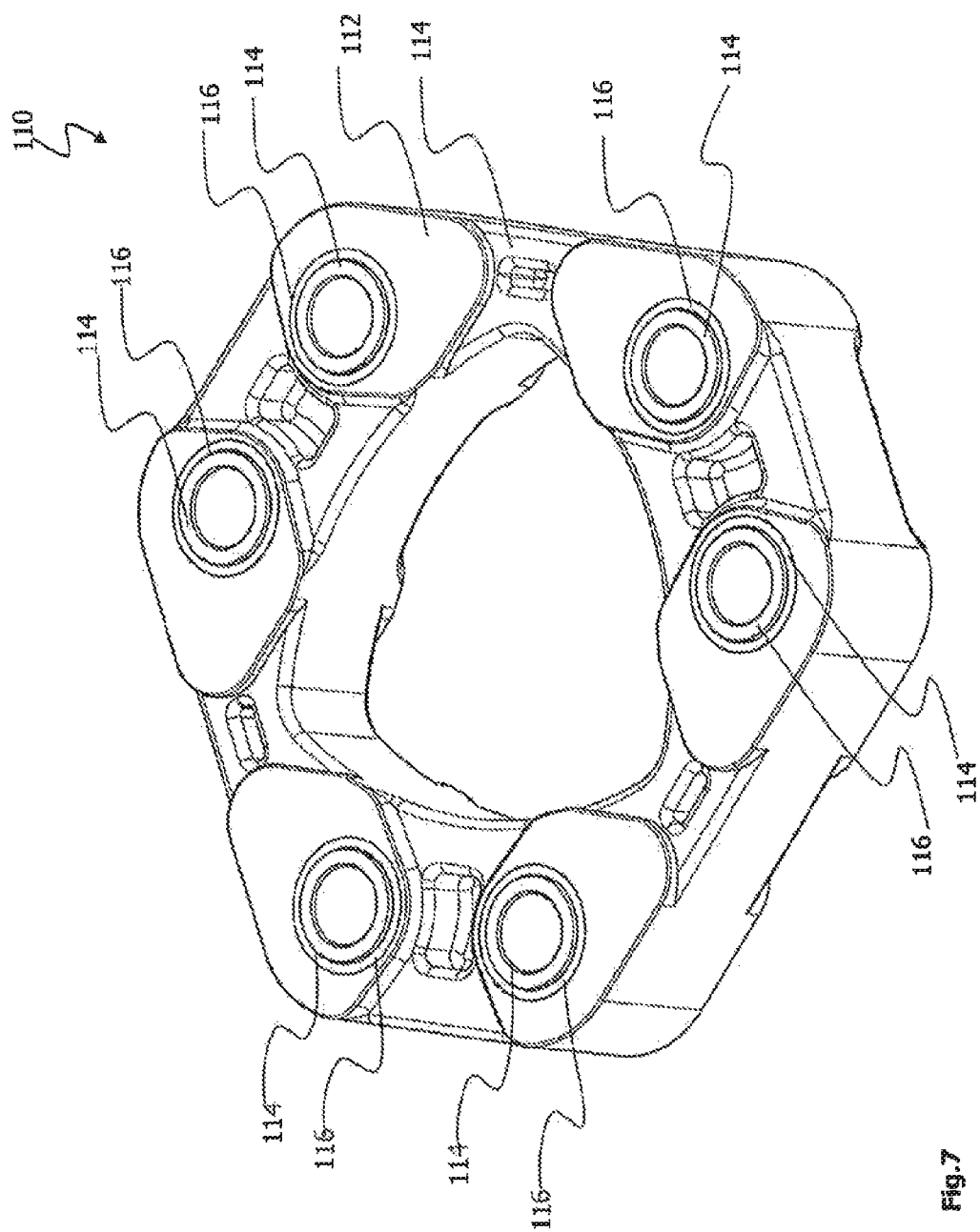
FIG. 7 shows a perspective view of a coupling element according to the invention in a second embodiment of the invention.

FIG. 7 shows a perspective view of the coupling element 110 according to a second embodiment of the invention.

FIG. 7 shows the flexible rubber cover 112, in which the bushings 114 and the flange elements 116 arranged on the bushing 114 are embedded in at least some sections.

Figure 8:
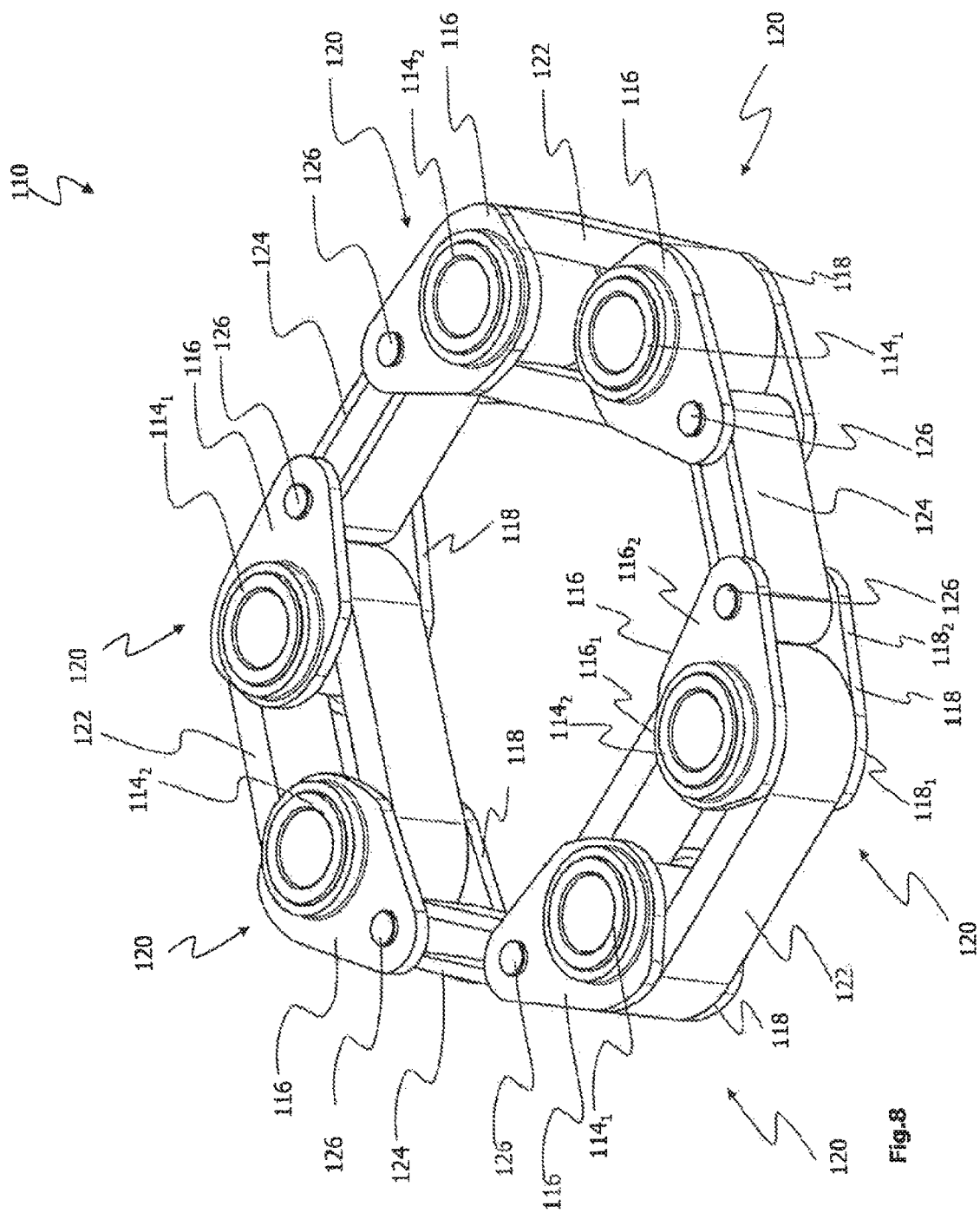
FIG. 8 shows a perspective view of the basic element of the coupling element according to FIG. 7.

FIG. 8 shows a perspective view of the basic element of the coupling element 110.

The primary loop bundles 122 are wrapped around two neighboring bushings $114_1$ and $114_2$ to form three bushing pairs. The primary loop bundles 122 are guided axially onto the bushings 114 over the flange elements 116 and 118.

The bushings pairs $114_1$ and $114_2$ formed by means of the primary loop bundles 122 are connected by secondary loop bundles 124, which are secured on the support arrangements 120 on the bushings 114. The secondary loop bundles 124 are secured on the support arrangements and/or on the flange elements 116 and 118 by fastening means 126.

The flange elements 116 and 118 have a receiving section $116_1$ and $118_1$ as well as a fastening section $116_2$ and $118_2$. The receiving section $116_1$ and $118_1$ serves to guide the primary loop bundles 124 and to receive the axial ends of the bushings 14.

The secondary loop bundles 126 are attached to the fastening section $116_2$ and $118_2$ via the fastening means 126. The fastening means 126 are bolts.

Figure 9:
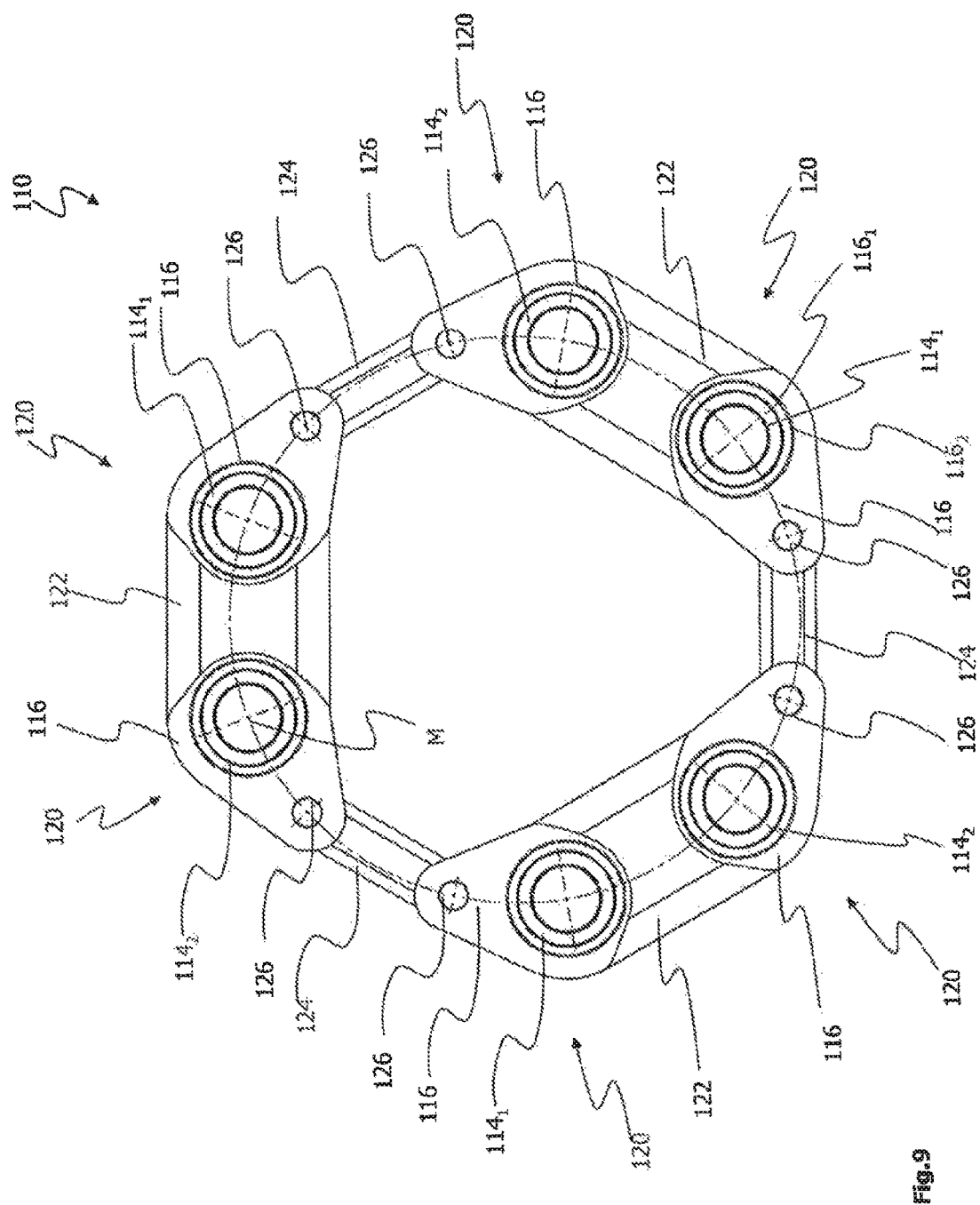
FIG. 9 shows a top view of the basic element according to FIG. 8.

FIG. 9 shows a top view of the basic element of the coupling element 110.

The primary loop bundles 122 form three bushing pairs $114_1$ and $114_2$. The three bushings pairs $114_1$ and $114_2$ are interconnected by secondary loop bundles 124, which are coupled to the support arrangements 120 by fastening means 126.

As can be determined from FIG. 9, the axes M of the bushings 114 and the axes of the bolts 126 lie on a radius.

Figure 10:
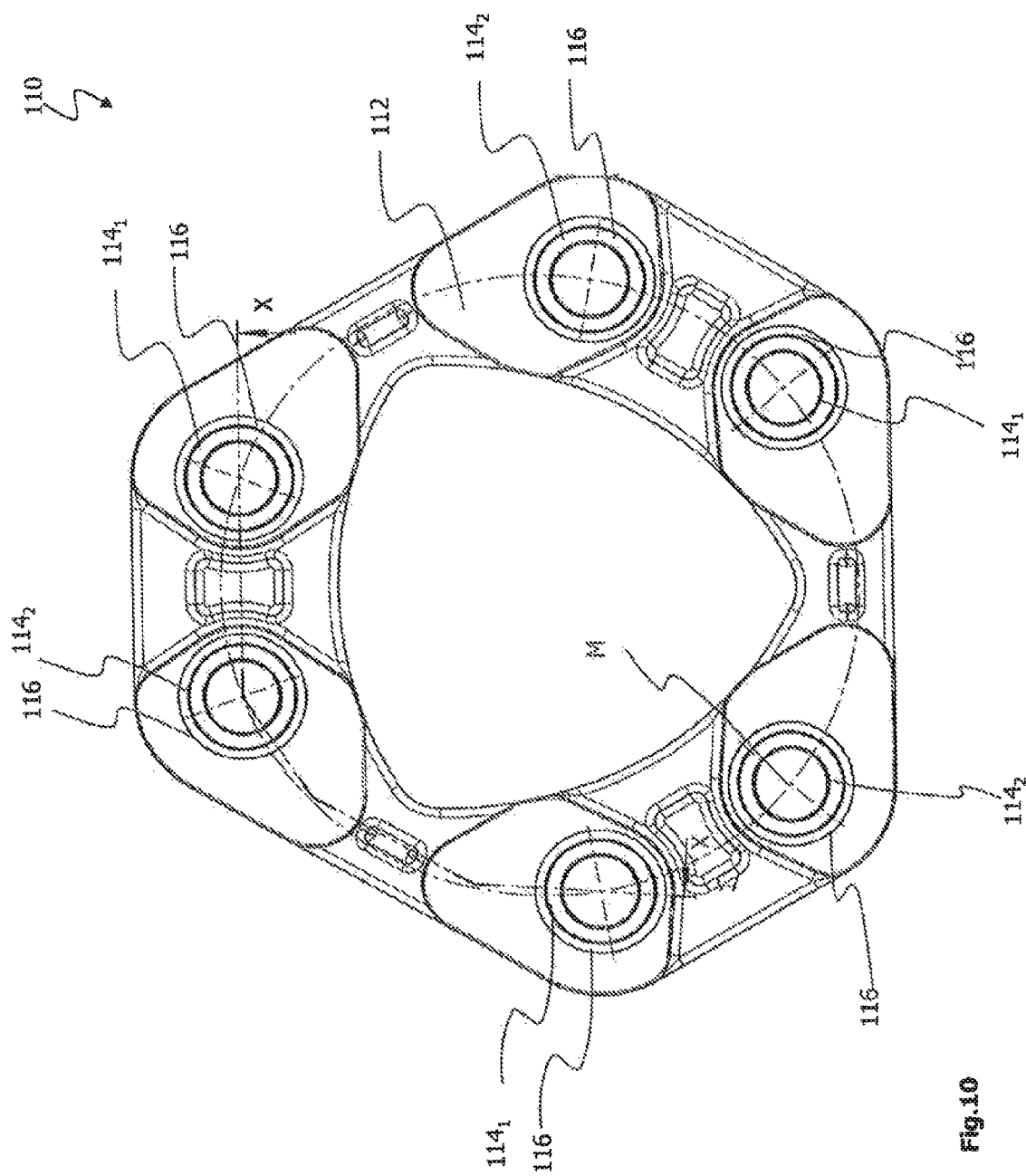
FIG. 10 shows a top view of the coupling element according to FIG. 7.

FIG. 10 shows a top view of the coupling element 110, in which the bushings 114, the flange elements 116 and the flexible rubber cover 112 can be seen, with the bushings 114 and the flange elements 116 embedded in it in at least some sections.

Figure 11:
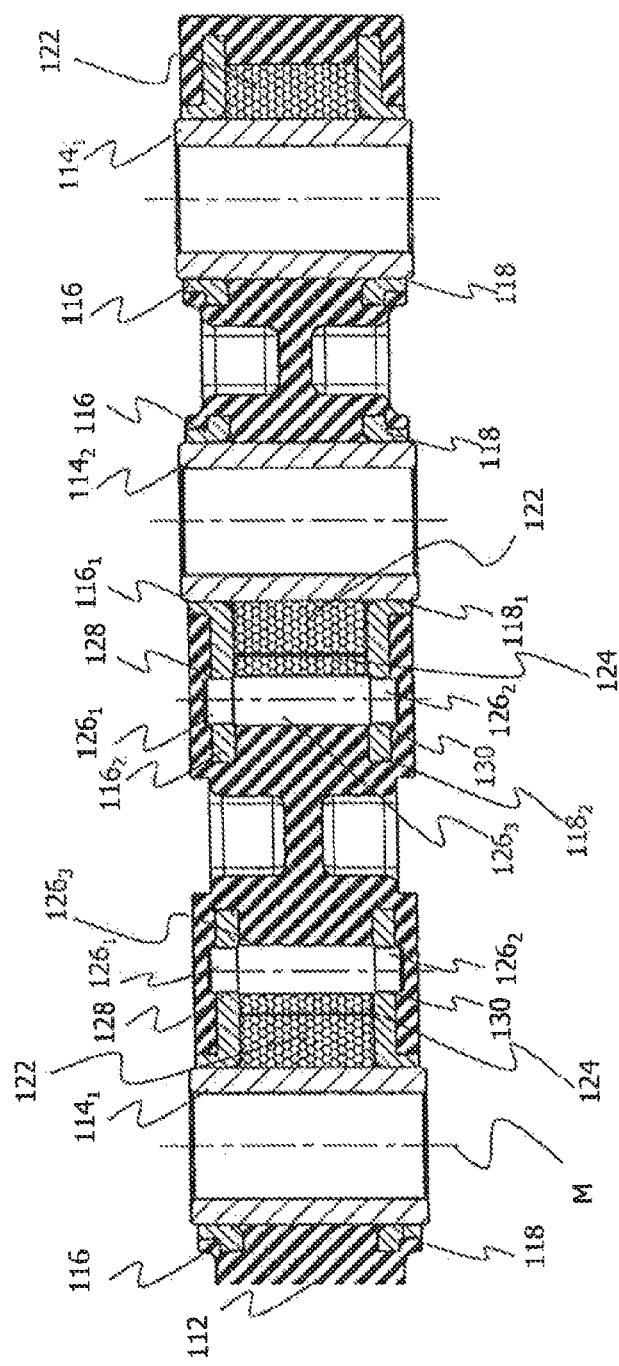
FIG. 11 shows a sectional view along the sectional X-X in FIG. 10.

FIG. 11 shows a sectional view along the sectional X-X in FIG. 10.

The bushing pair $114_1$ and $114_2$ around which a primary loop bundle 122 is wrapped can be seen in FIG. 11. The bushing pair $114_1$ and $114_2$ is connected to a bushing $114_2$ of another bushing pair by means of the secondary loop bundle 124.

As in the first embodiment, the bolts 126 are designed with steps, i.e., with a reduced diameter at the ends $126_1$ and $126_2$. The secondary loop bundle 124 is in contact in at least some sections with the central section $126_3$ having the larger diameter. The flange elements 116, 118 can guide axially both the primary loop bundle 122 on the bushing 114 and also the secondary loop bundle 124 on the bolt 126.

As in the first embodiment, the bushings 114, the flange elements 116, 118, the loop bundles 122, 124 and bolts 126 are each embedded at least partially in the flexible rubber cover 112.

FIG. 12 shows again a top view of the elastic coupling element 110 but with new sectional lines indicated therein.

Figure 12:
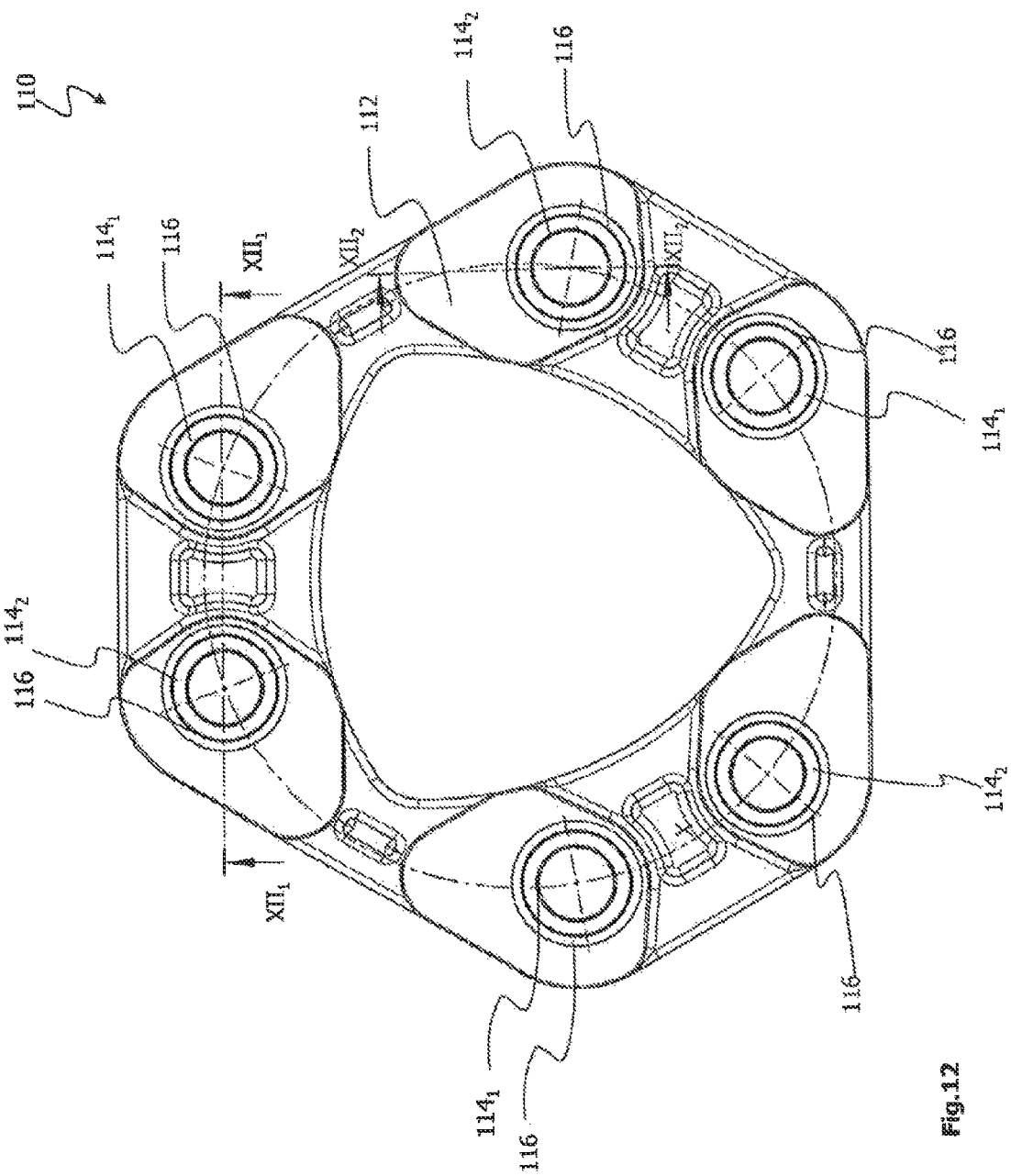
FIG. 12 shows a top view of the coupling element according to FIG. 7.
Figure 13:
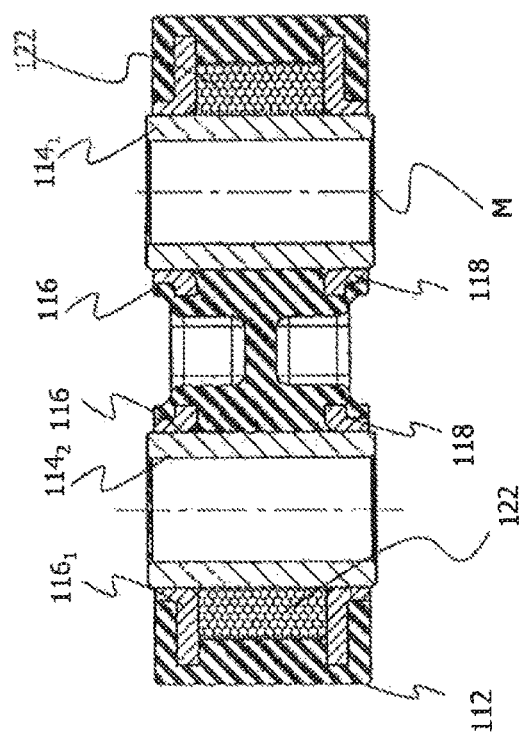
FIG. 13 shows a sectional view along the sectional line $XII_1$-$XII_1$ from FIG. 12.

FIG. 13 shows a sectional view along the sectional line $XII_1$-$XII_1$ in FIG. 12.

FIG. 13 shows a bushing pair $114_1$, $114_2$ around which a primary loop bundle 122 is wrapped. The primary loop bundle 122 is guided axially over the flange elements 116, 118 on the bushings $114_1$ and $114_2$.

Figure 14:
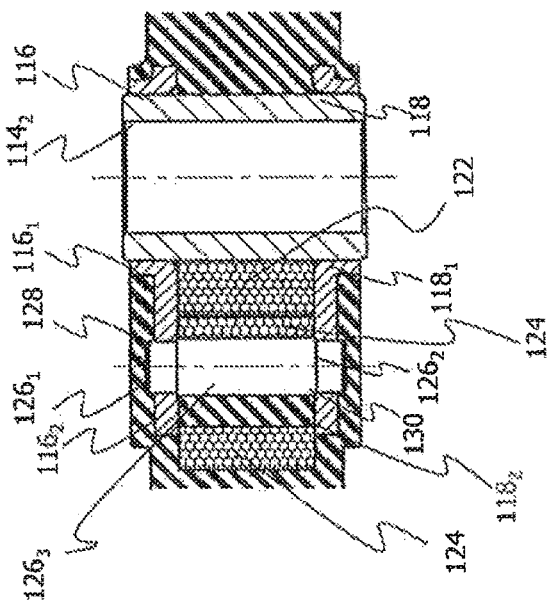
FIG. 14 shows a sectional view along the sectional line $XII_2$-$XII_2$ from FIG. 12.

FIG. 14 shows a sectional view along the sectional line $XII_2$-$XII_2$ in FIG. 12.

FIG. 14 shows a bushing 114 with the support arrangement 120 mounted on it.

The flange elements 116 and 118 are pressed onto the bushings 114. As in the first embodiment, the flange elements 116 and 118 have a tubular section adjacent to the bushings 114 and have a flange section, which extends perpendicular to the axes of the bushings 114 and comprises the fastening section $116_2$ and $118_2$ among other things. Openings 128 and 130, which receive the ends $126_1$ and $126_2$ of the bolt 126 are formed in the fastening section $116_2$ and $118_2$. The secondary loop bundle 124 is in contact with the central section $126_3$ of the bolt 126.

Figure 15:
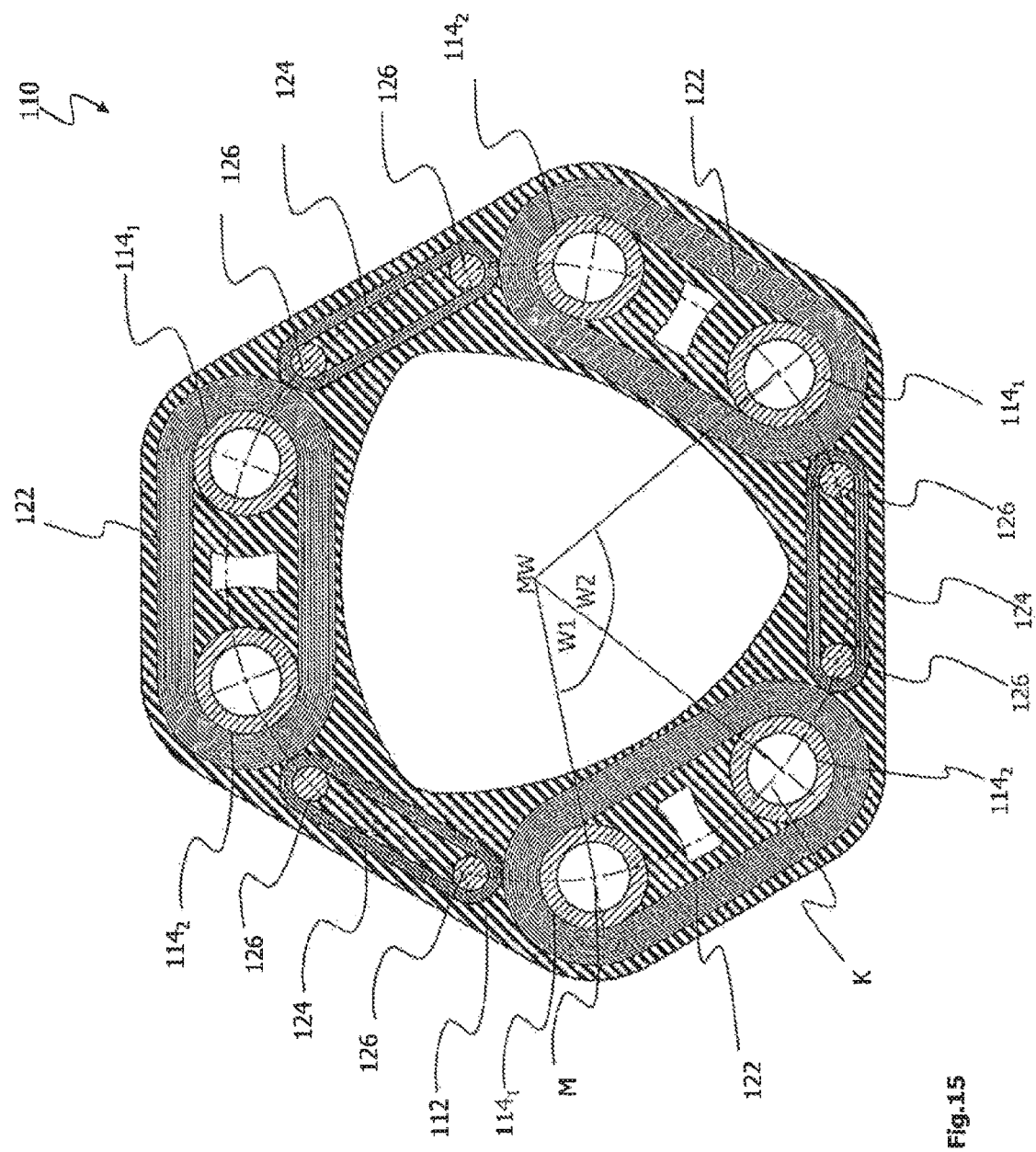
FIG. 15 shows a sectional view of the coupling element according to the second embodiment of the invention.

FIG. 15 shows a sectional view through the coupling element 110. One can see in FIG. 15 the three bushings pairs $114_1$ and $114_2$ formed by the primary loop bundles 122. The smaller secondary loop bundles 124, which are coupled by the bolts 126 to the bushing pairs $114_1$ and $114_2$ in a torque-transmitting manner, lie between the bushing pairs $114_1$ and $114_2$ around which the primary loop bundles 122 are wrapped. Recesses, which serve to adjust the stiffness of the coupling element 110, can be seen between the bushings $114_1$ and $114_2$.

Figure 16:
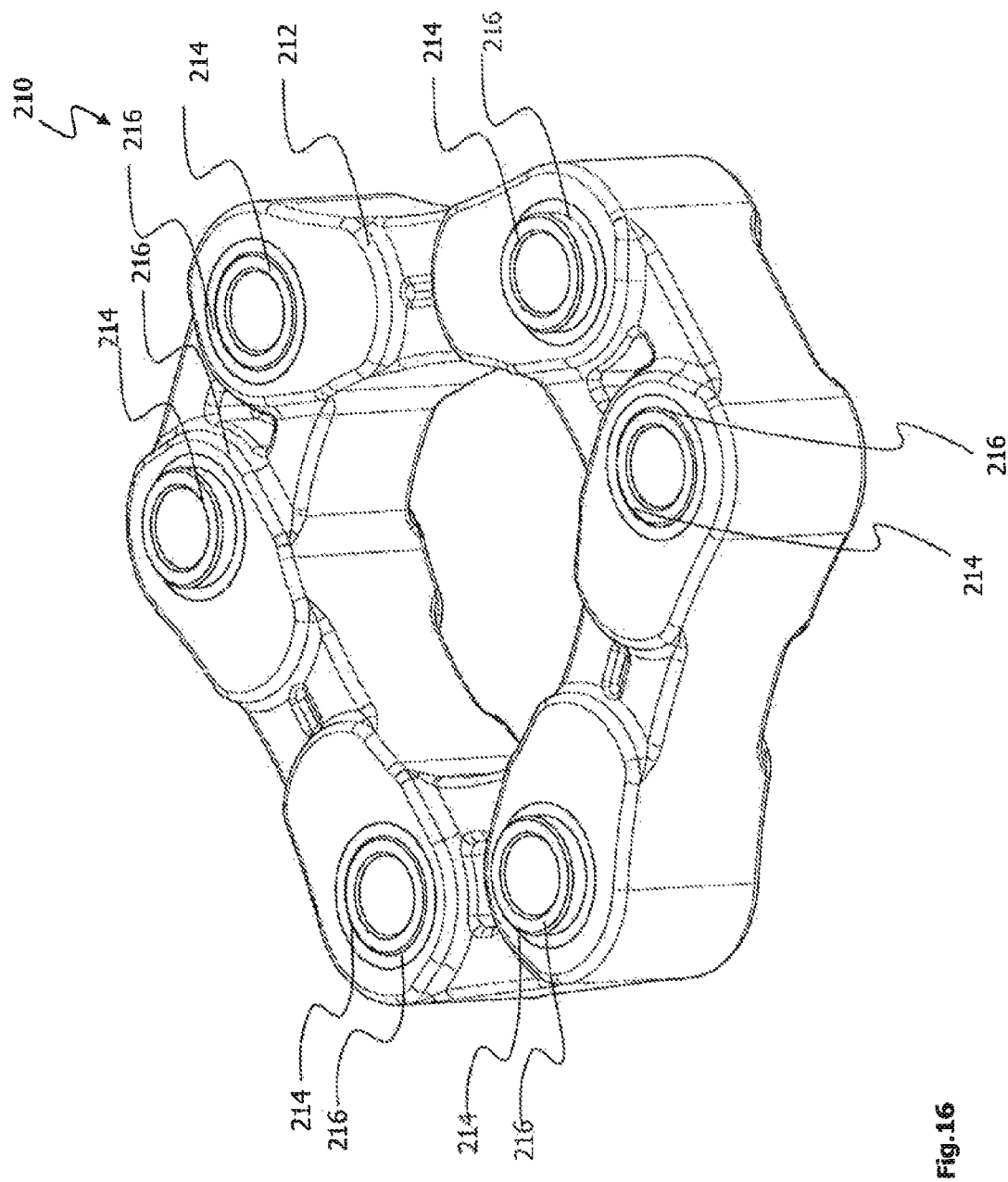
FIG. 16 shows a perspective view of a coupling element according to the invention in a third embodiment of the invention.

FIG. 16 shows a perspective view of the coupling element 210 according to a third embodiment of the invention.

FIG. 16 shows the flexible rubber cover 212 in which the bushings 214 and the flange elements 216 arranged on the bushings 214 are embedded in at least some sections.

Figure 17:
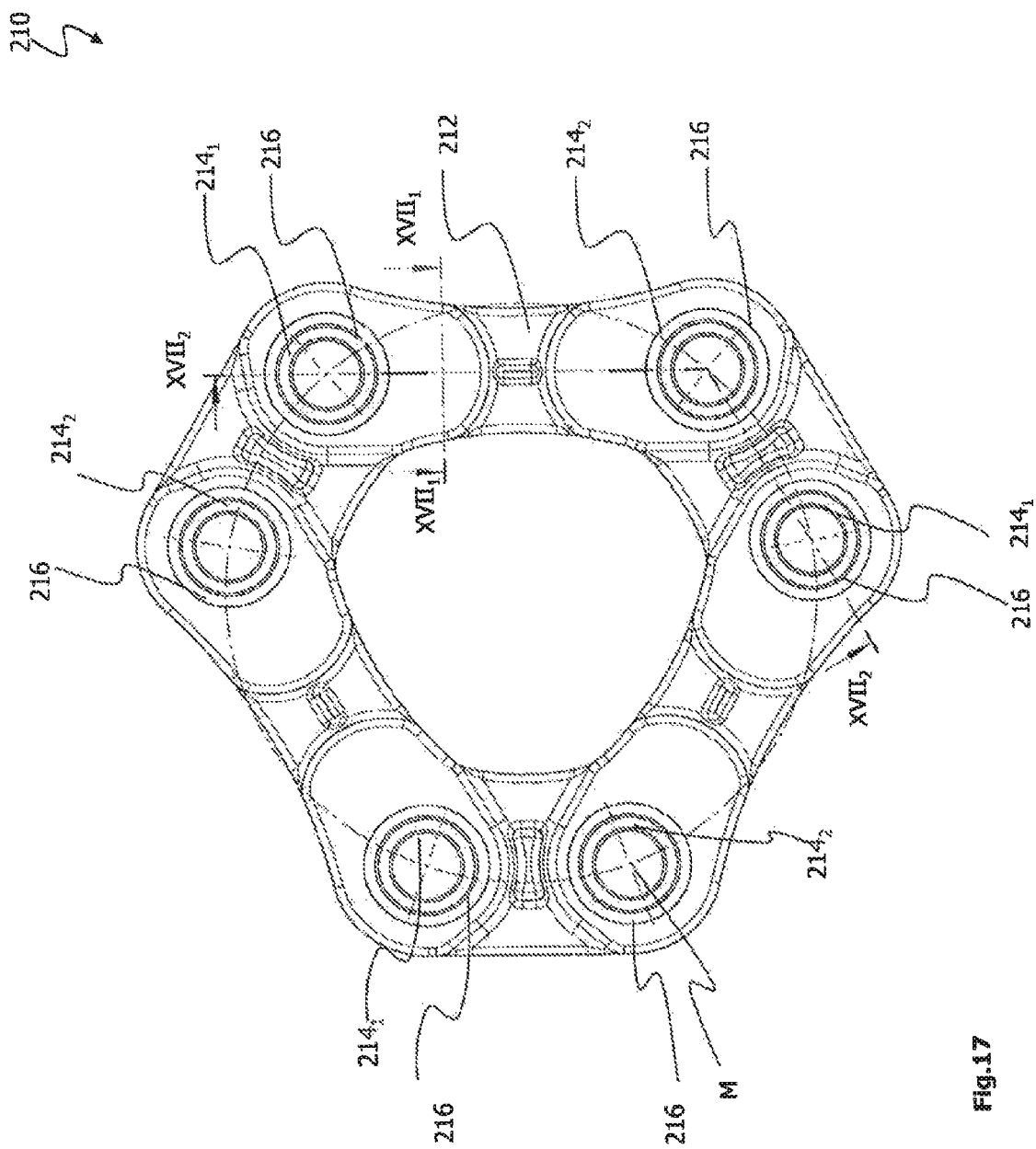
FIG. 17 shows a top view of a coupling element according to FIG. 16.

FIG. 17 shows a top view of the coupling element 210.

Figure 18:
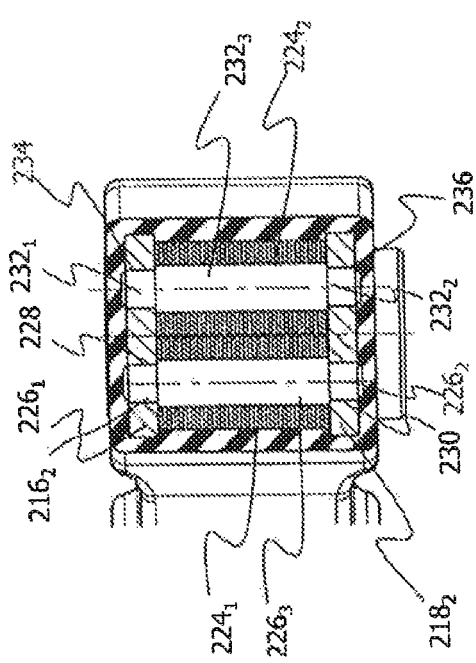
FIG. 18 shows a sectional view along the sectional line $XVII_1$-$XVII_1$ from FIG. 17.

FIG. 18 shows a sectional view along the sectional line $XVII_1$-$XVII_1$ in FIG. 17.

FIG. 18 shows bolts 226 and 232 each of which is wrapped by a secondary loop bundle $224_1$ and $224_2$. The bolts 226 and 232 are held in openings 228 and 234 in the flange element 216 and in openings 230 and 236 in the flange element 218. The openings 228, 230, 234 and 236 are formed in the fastening sections $216_2$ and $218_2$ of the flange elements 216 and 218. The bolts 226 and 232 are formed with steps, as in the embodiments already described above, and they each have a smaller diameter at their ends $226_1$ and $226_2$, $232_1$ and $232_2$ than in their central section $226_3$ and $232_3$.

Figure 19:
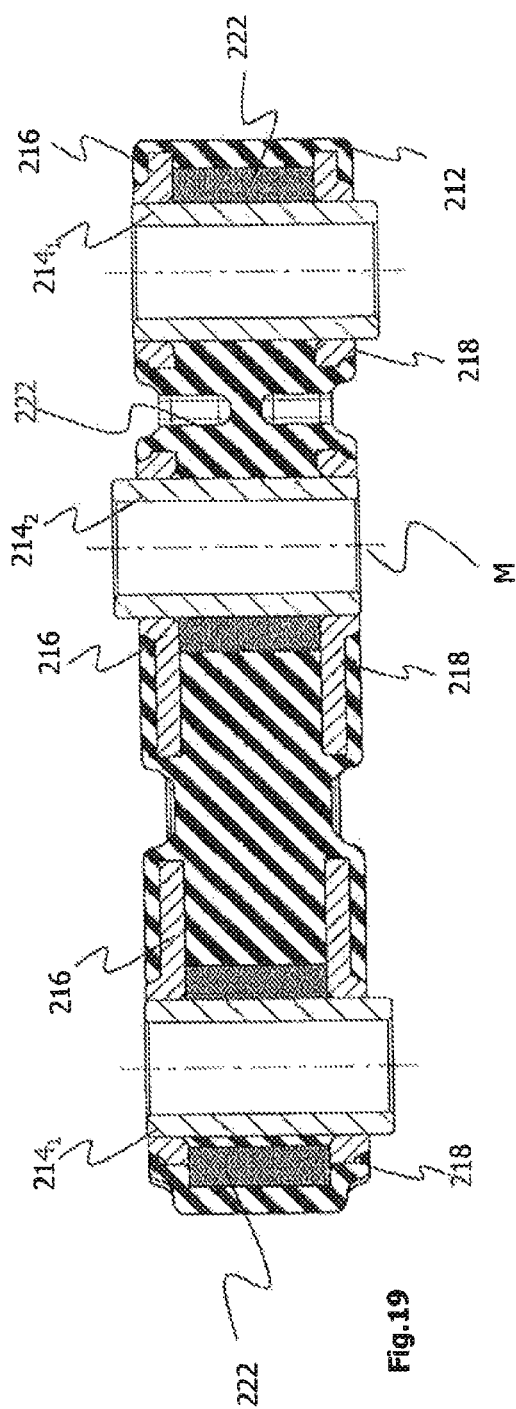
FIG. 19 shows a sectional view along the sectional line $XVII_2$-$XVII_2$ in FIG. 17.

FIG. 19 shows a sectional view along the sectional line $XVII_2$-$XVII_2$ in FIG. 16.

FIG. 19 shows only the primary loop bundles 222 because when the profile of the sectional line $XVII_2$-$XVII_2$ is taken into account, it can be seen that the sectional line runs exactly between the two parallel secondary loop bundles $224_1$ and $224_2$ (see FIG. 18).

FIG. 19 also shows the flange elements 216 and 218, which enclose the cross section of the primary loop bundles 222 in the axial direction of the bushings $214_1$ and $214_2$.

FIG. 20 shows another sectional view of the coupling element 210.

The primary loop bundles 222 wrap around the bushing pairs $214_1$ and $214_2$ to form three bushings pairs $114_1$, $214_2$. The two secondary loop bundles $224_1$ and $224_2$, which run in parallel wrap around bolts 226 and 232 of the support arrangement 220. The three neighboring bushing pairs $214_1$ and $214_2$ are coupled to one another by means of the secondary loop bundles $224_1$ and $224_2$. The primary loop bundles 222 and the two parallel secondary loop bundles $224_1$ and $224_2$ are provided in alternation in the flexible rubber cover 212.

Since the primary loop bundles 222 and the secondary loop bundles $224_1$ and $224_2$ in the radial direction of the coupling element 210 are also aligned in this embodiment, the coupling element 210 has a relatively small size in the axial direction (see FIGS. 17 and 18) even if two parallel secondary loop bundles $224_1$ and $224_2$ are provided.

Figure 21:
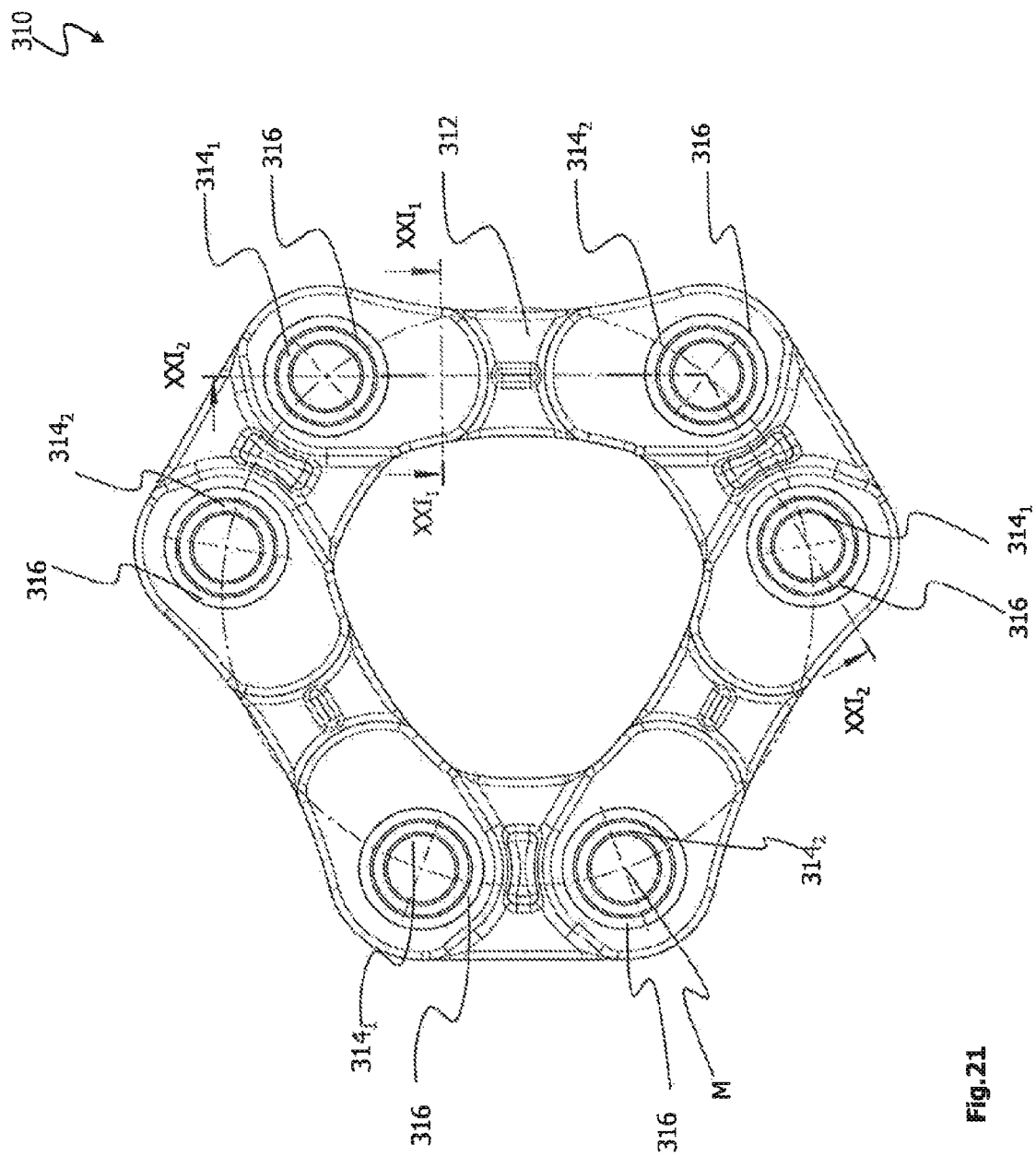
FIG. 21 shows a top view of the coupling element according to a fourth embodiment of the invention.

FIG. 21 shows a front view of the coupling element 310 according to a fourth embodiment of the invention.

Again in FIG. 21, the flexible rubber cover 312, the bushings 314 and the flange elements 316 can be seen.

Figure 22:
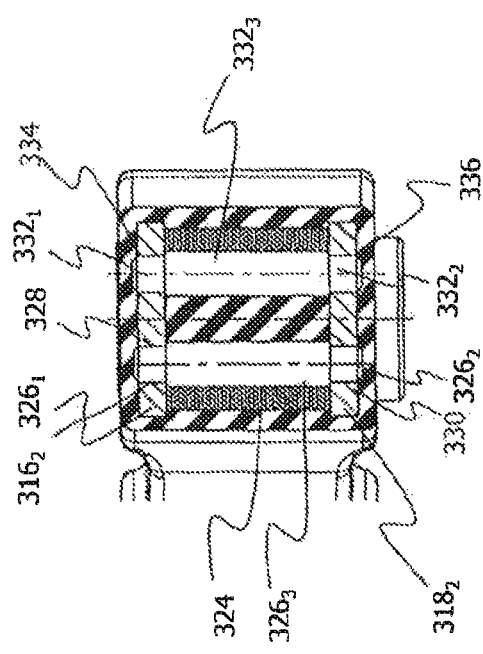
FIG. 22 shows a sectional view along the sectional line $XXI_1$-$XXI_1$ from FIG. 21.

FIG. 22 shows a sectional view along the sectional line $XXI_1$-$XXI_1$ in FIG. 21.

The flange elements 316 and 318, which are connected to the bolts 326 and 332, can be seen in FIG. 22. A single secondary loop bundle 324 is wrapped around the bolts 326 and 332. The bolts 326 and 334 are connected to the flange elements 316 and 318 through the openings 328, 330, 334 and 336.

The bolts 326 and 332 are designed with steps, just as in the embodiments described above, i.e., they have a smaller diameter at their ends $326_1$ and $326_2$, $332_1$ and $332_2$ than in their central section $326_3$ and $332_2$.

The ends $326_1$, $326_2$ and $332_1$, $332_2$ of the bolts 326 and 332 are held in the openings 328, 330, 334 and 336 of the flange elements 316 and 318.

Figure 23:
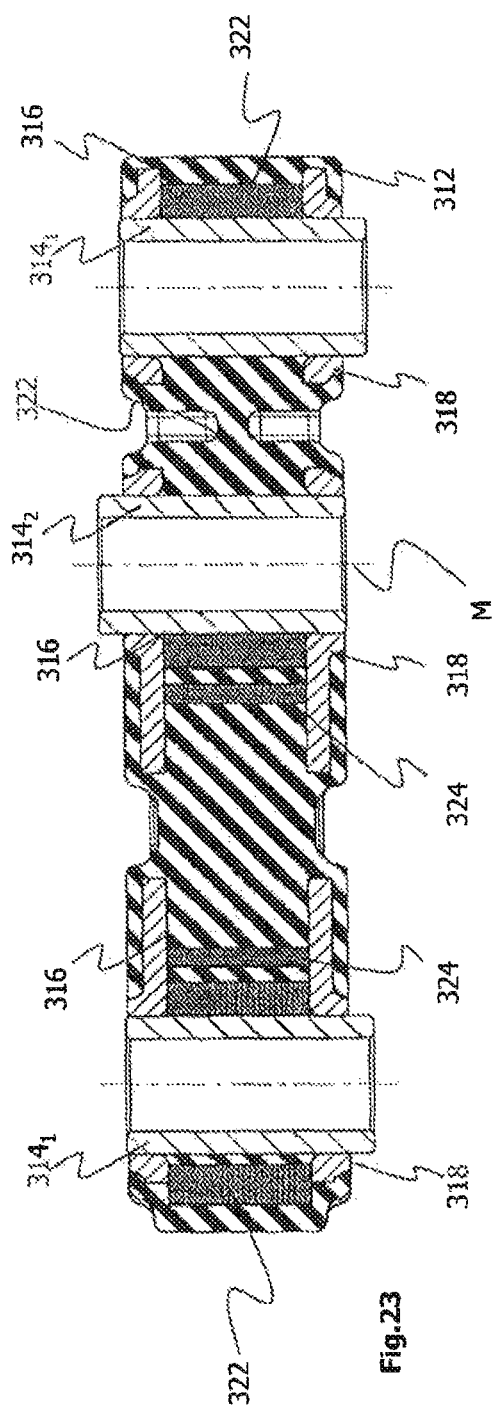
FIG. 23 shows a sectional view along the sectional line $XXI_2$-$XXI_2$ from FIG. 21.

FIG. 23 shows a sectional view along the sectional line $XXI_1$-$XXI_2$ according to FIG. 21. The primary loop bundles 332 can be seen in FIG. 23, each wrapped around a bushings pair $314_1$ and $314_2$. Furthermore, a secondary loop bundle 323 which couples two neighboring bushing pairs $314_1$, $314_2$ to one another can be seen. The flange elements 316 and 318 between them form the cross section of primary loop bundles 323 and the secondary loop bundles 324 in the axial direction of the bushings 314.

Figure 24:
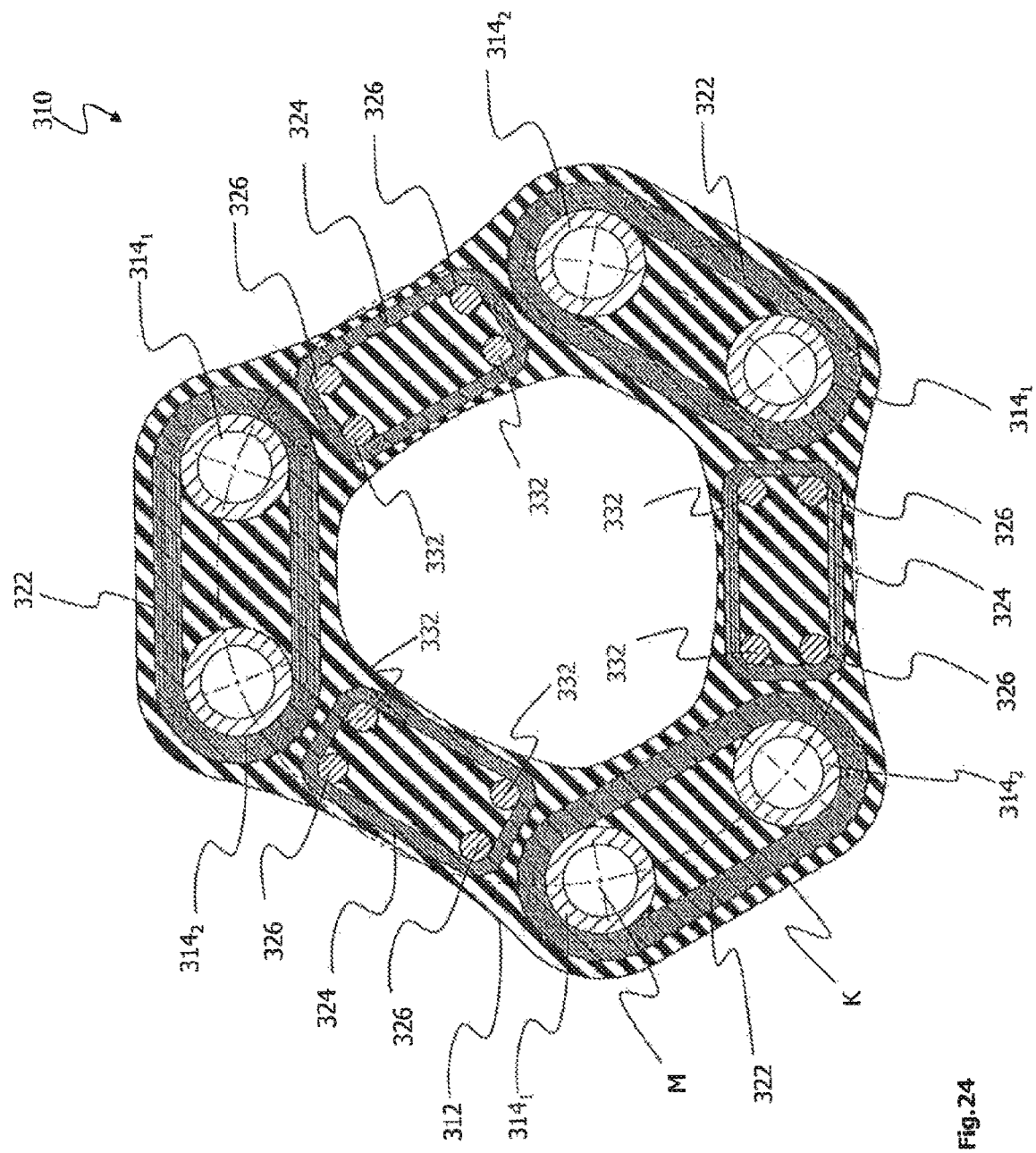
FIG. 24 shows a sectional view of the coupling element according to the fourth embodiment of the invention.
Figure 25:
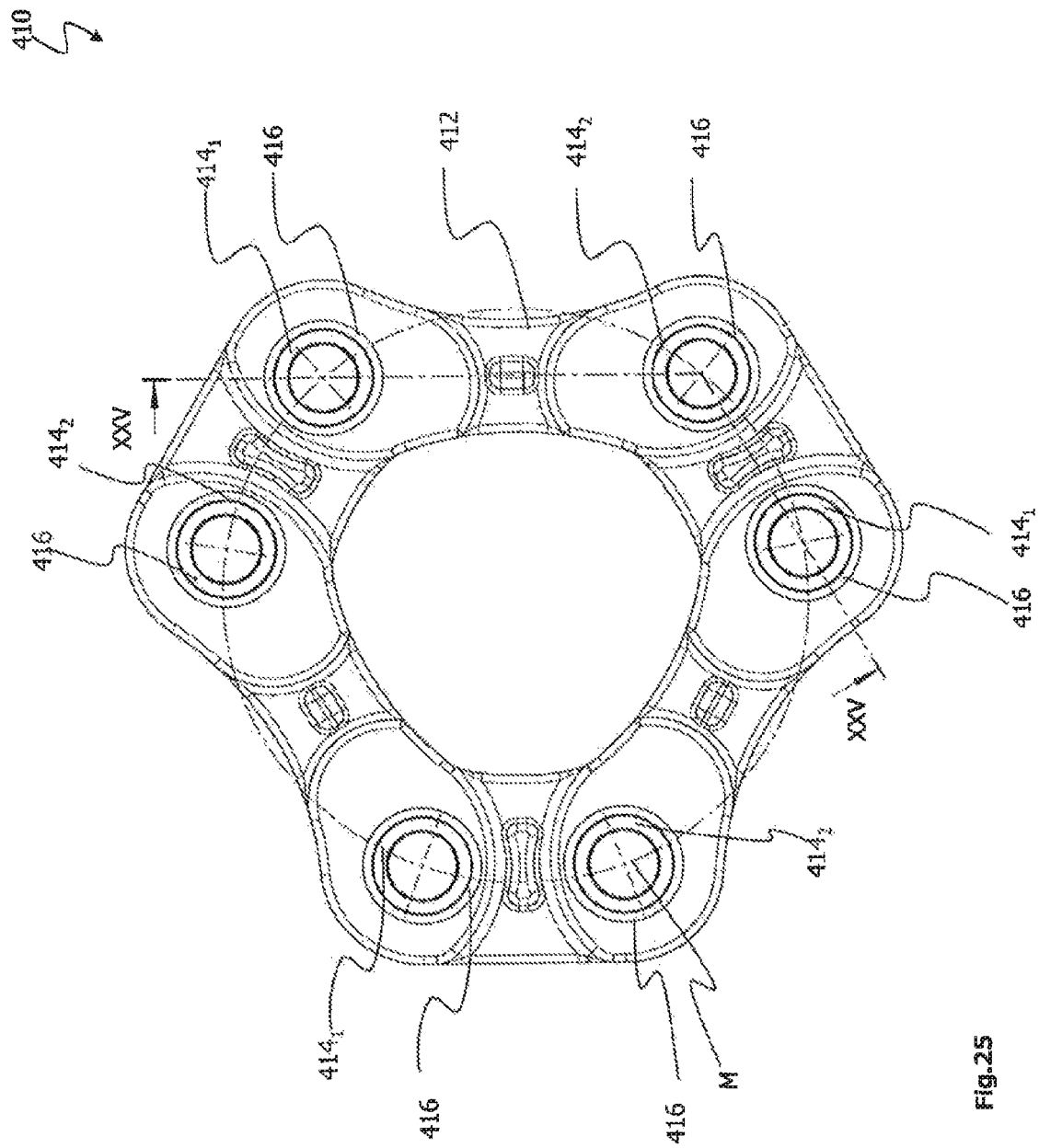
FIG. 25 shows a top view of the coupling element according to a fifth embodiment of the invention.

FIG. 24 shows another sectional view of the coupling element 310.

The bolts 326, 332 of the support arrangements 320 on neighboring bushings $314_1$ and $314_2$ have a single secondary loop bundle 324 wrapped around them. The secondary loop bundles 324 have almost a rectangular course.

FIGS. 25 to 28 show another embodiment of the coupling element 410 according to the invention.

The embodiment according to FIGS. 25 to 28 corresponds largely to the first embodiment of the invention shown in FIGS. 1 to 6 and described above.

Figure 26:
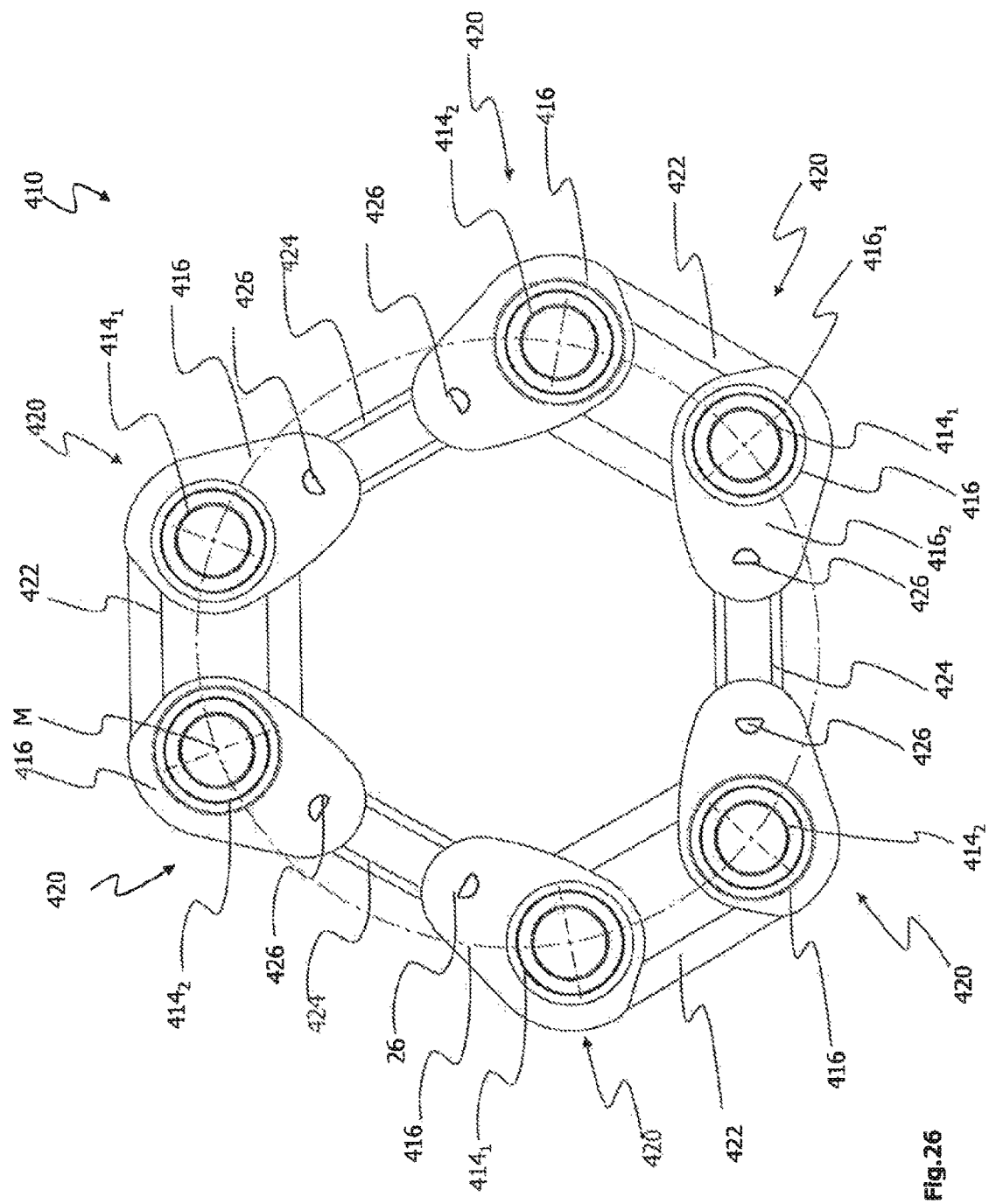
FIG. 26 shows a top view of the basic element of the coupling element according to FIG. 25.
Figure 27:
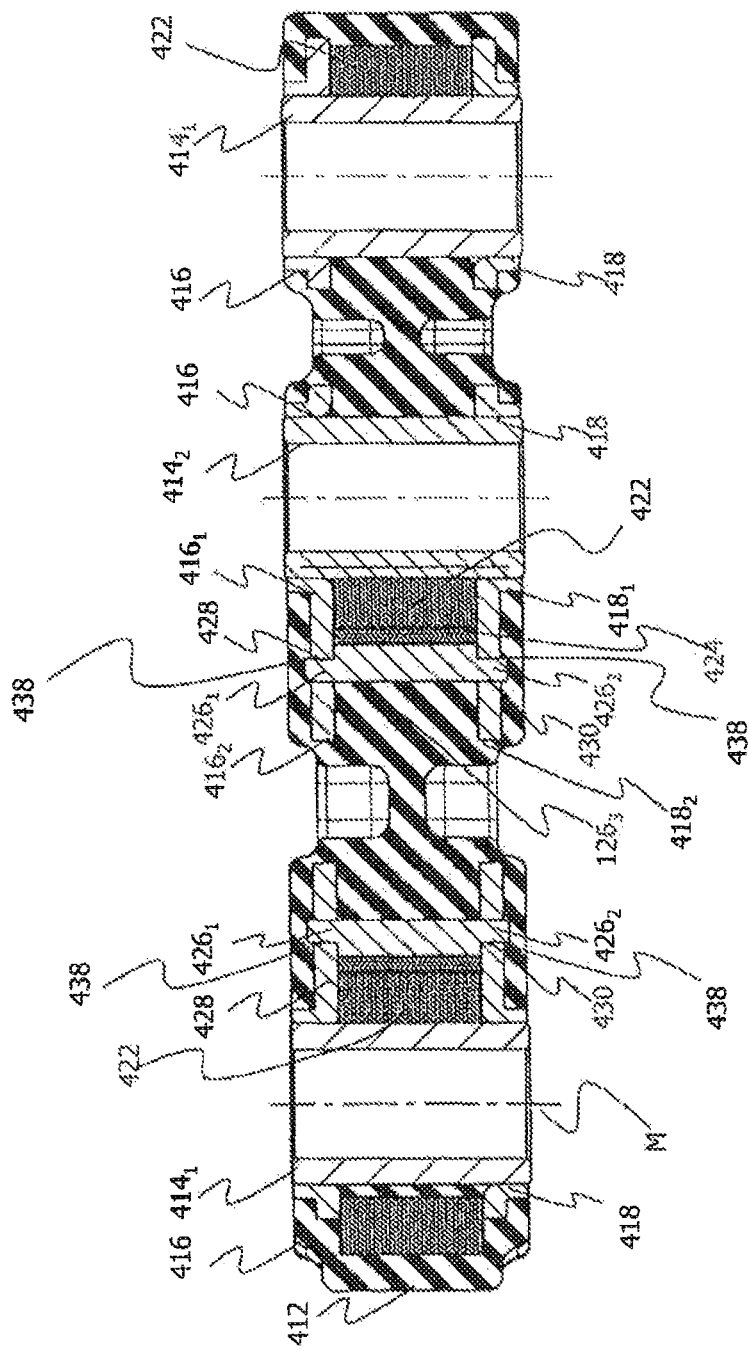
FIG. 27 shows a sectional view along the sectional line XXV-XXV from FIG. 25.
Figure 28:
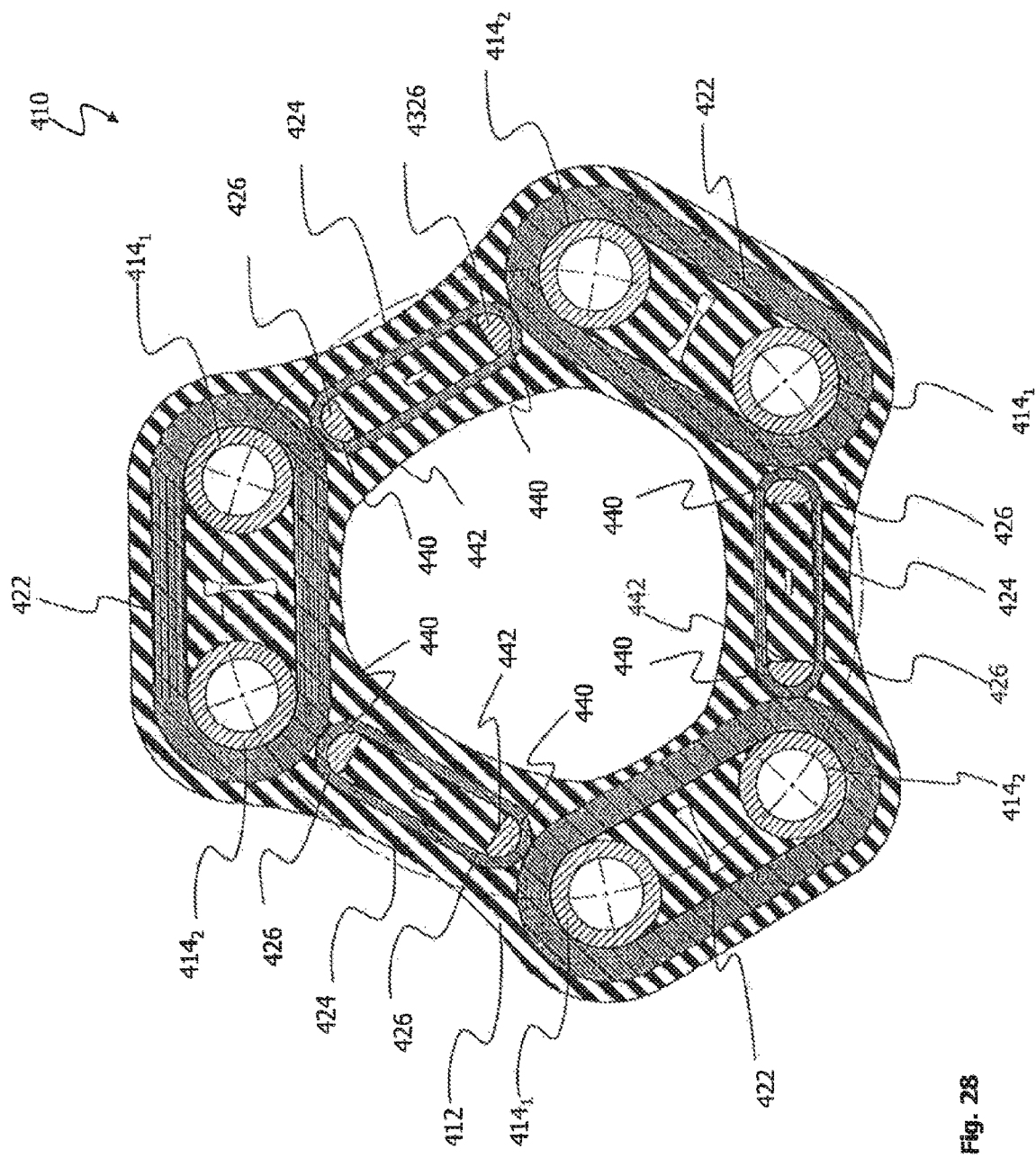
FIG. 28 shows a sectional view of the coupling element according to the fifth embodiment of the invention.

However, the differences in comparison with the first embodiment of the invention are clearly recognizable in FIGS. 26, 27 and 28.

The bolts 426, 432 according to this embodiment have a semicircular cross section. Accordingly, the openings 428 and 430 in the flange elements 416 and 418 are designed in a semicircular shape. The secondary loop bundles 424 each have a reduced cross section, i.e., they are designed with less thickness in comparison with the first embodiment.

The bolts 426, 430 have step 438 on their ends 426₁ and 426₂, serving to connect the bolts 426 to the semicircular openings 428, 430 in the flange elements 416 and 418.

The rounded section 440 of the bolts 426 serves as a contact surface for the secondary loop bundles 424. The section 442 of the bolts 426 running essentially in a straight line comes in contact only with a flexible rubber cover 412.

Figure 29:
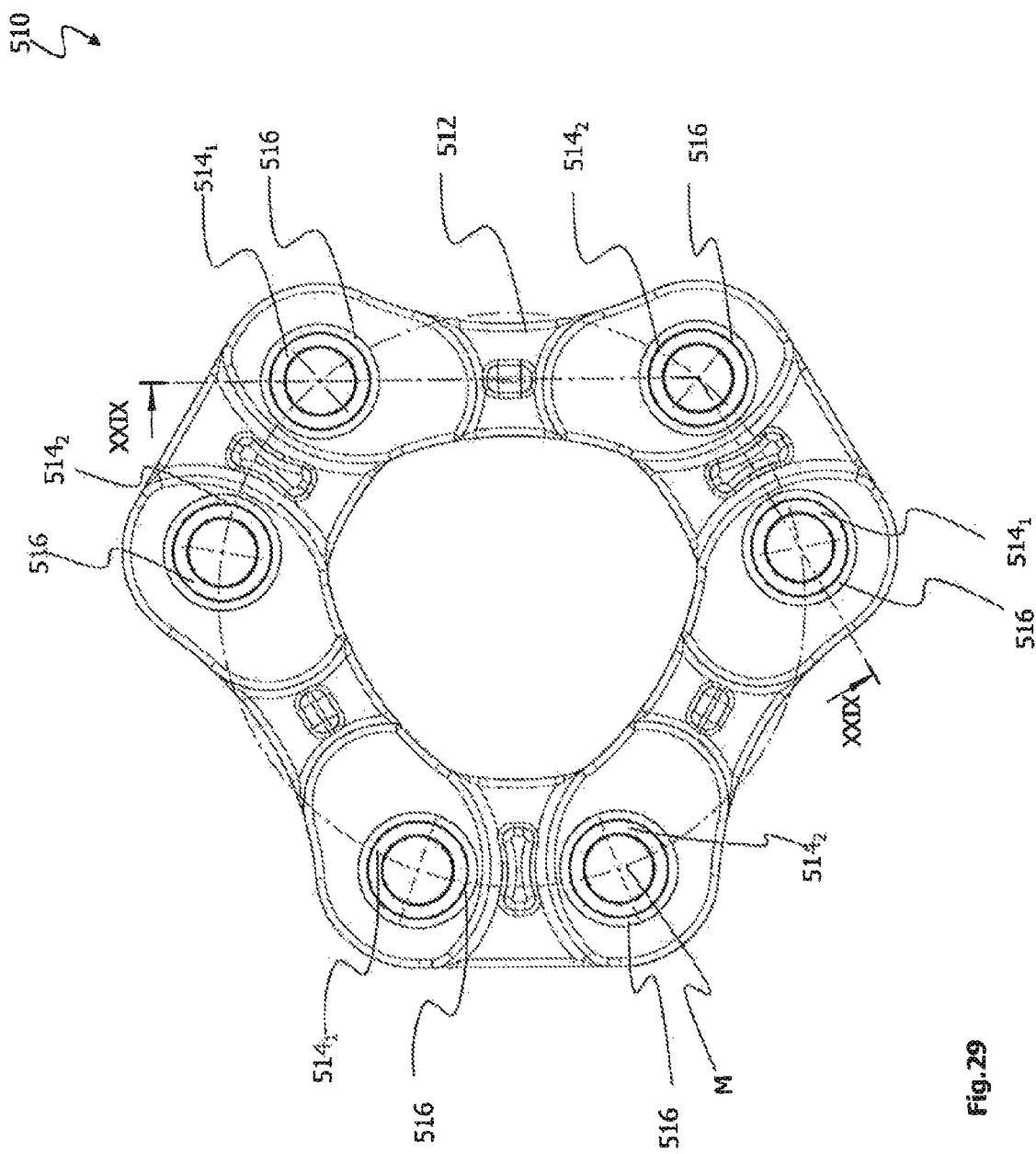
FIG. 29 shows a top view of a coupling element according to a sixth embodiment of the invention.
Figure 30:
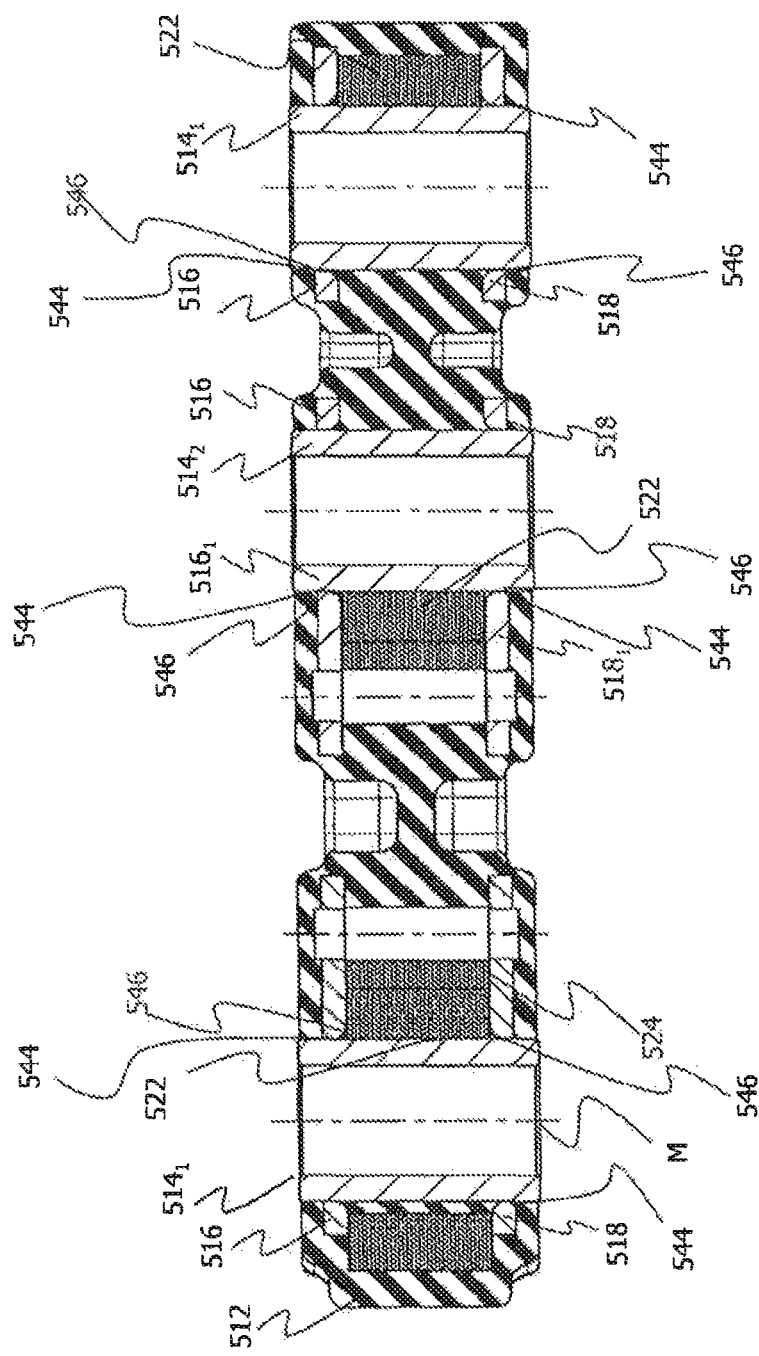
FIG. 30 shows a sectional view along the sectional line XXIX-XXIX from FIG. 29.
Figure 31:
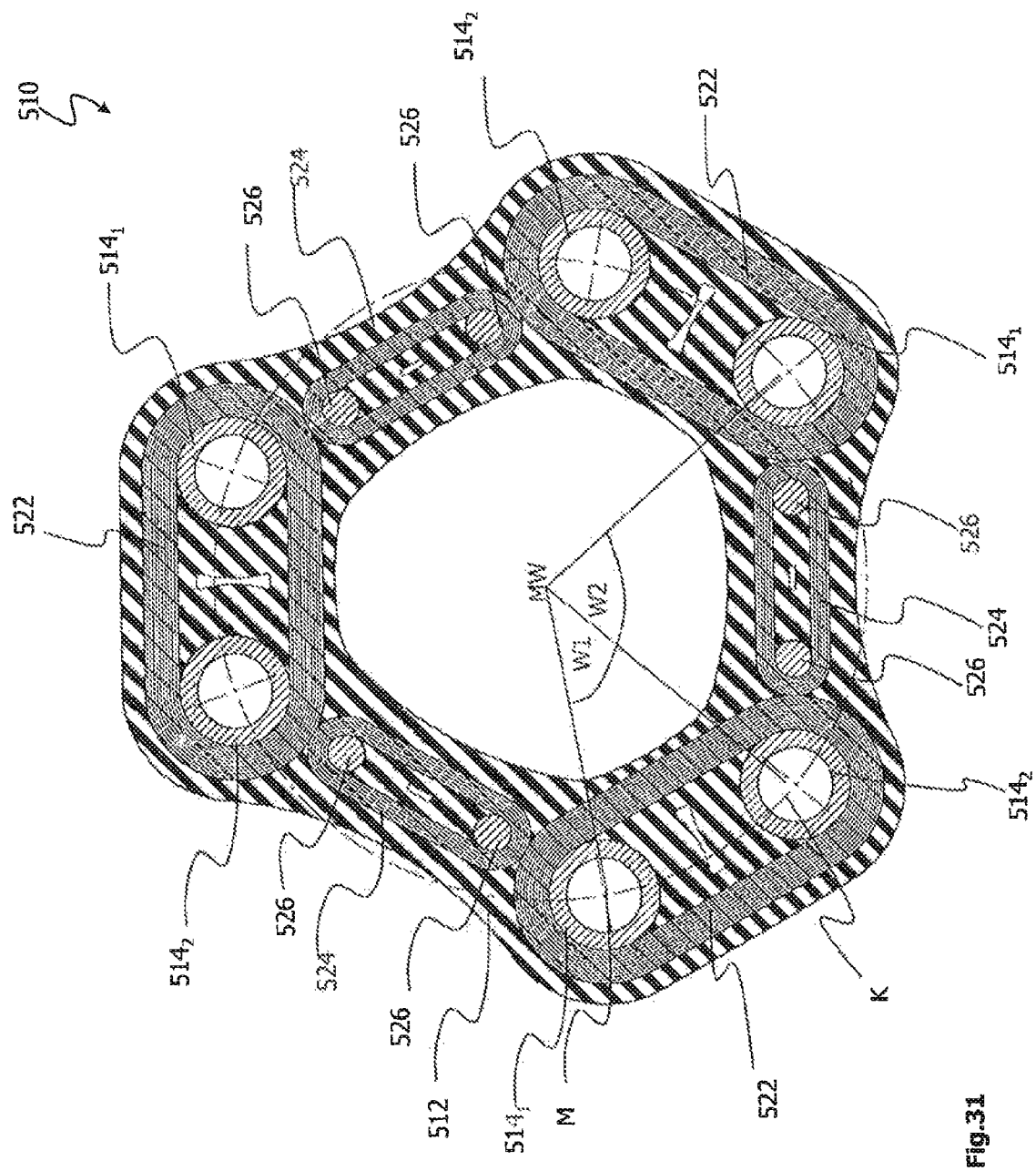
FIG. 31 shows a sectional view of the coupling element according to the sixth embodiment of the invention.

FIGS. 29 to 31 show another embodiment of the coupling element 510 according to the invention.

The embodiment shown in FIGS. 29 to 31 corresponds in turn largely to the first embodiment of the invention shown in FIGS. 1 to 6.

The flange elements 516 and 518 according to this embodiment are each designed in the form of disks.

The disk-shaped flange elements 516 and 518 each have a receiving section 516₁, 518₁ and a fastening section 516₂, 518₂. The receiving section 516₁ and 518₁ serves to receive the bushings 514. To receive the bushings 514, an opening 544 is provided in the receiving section 516₁ and 518₁ as in the embodiments described above. According to this embodiment, a bevel 546, which offers advantages in terms of lifetime, is provided on the axial end of the opening 544 pointing in the direction of the primary loop bundles 522 and the secondary loop bundles 524.

As can be seen in all the preceding embodiments described above, FIGS. 31 show that the bushings 514₁ and 514₂ which are connected by the primary loop bundle 522 to form a bushing pair 514₁, 514₂ are offset relative to one another by a predetermined first angle W1. The bushing pairs 514₁, 514₂, which are formed by the primary loop bundles 522, are also arranged with an offset from one another by a predetermined second angle W2. The predetermined first angle W1 can be different from the predetermined second angle W2.

Figure 32:
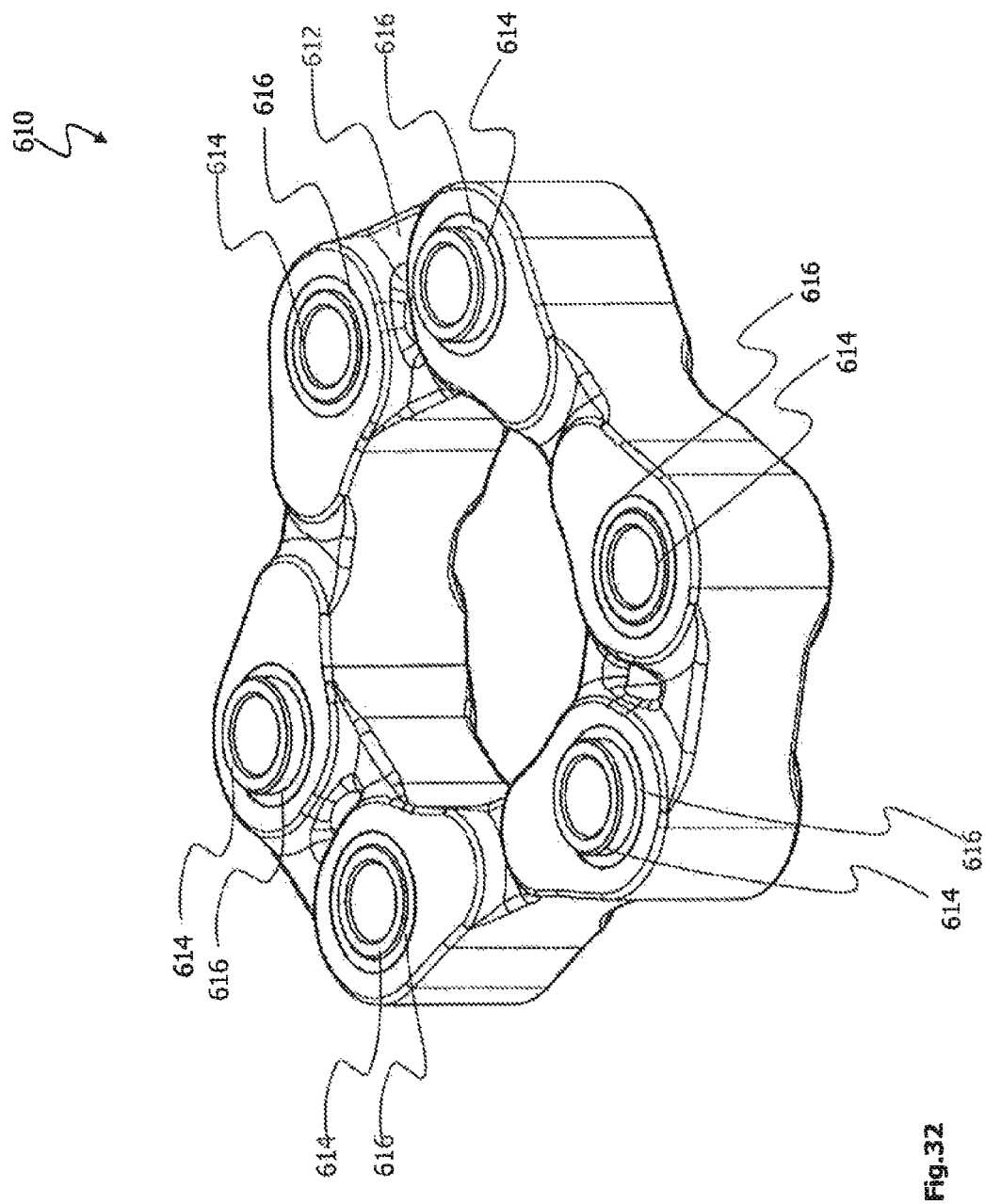
FIG. 32 shows a perspective view of the coupling element according to the seventh embodiment of the invention.

FIG. 32 shows a perspective view of the coupling element according to a seventh embodiment of the invention. The coupling element 610 has a flexible rubber cover 612 in which a plurality of bushings 614 and a plurality of flange element 616 arranged on the bushings 614 are embedded in at least some sections. The flange elements 616 are part of a support arranged 620, which is not show completely in FIG. 32, for axial guidance of loop bundles (not shown).

Figure 33:
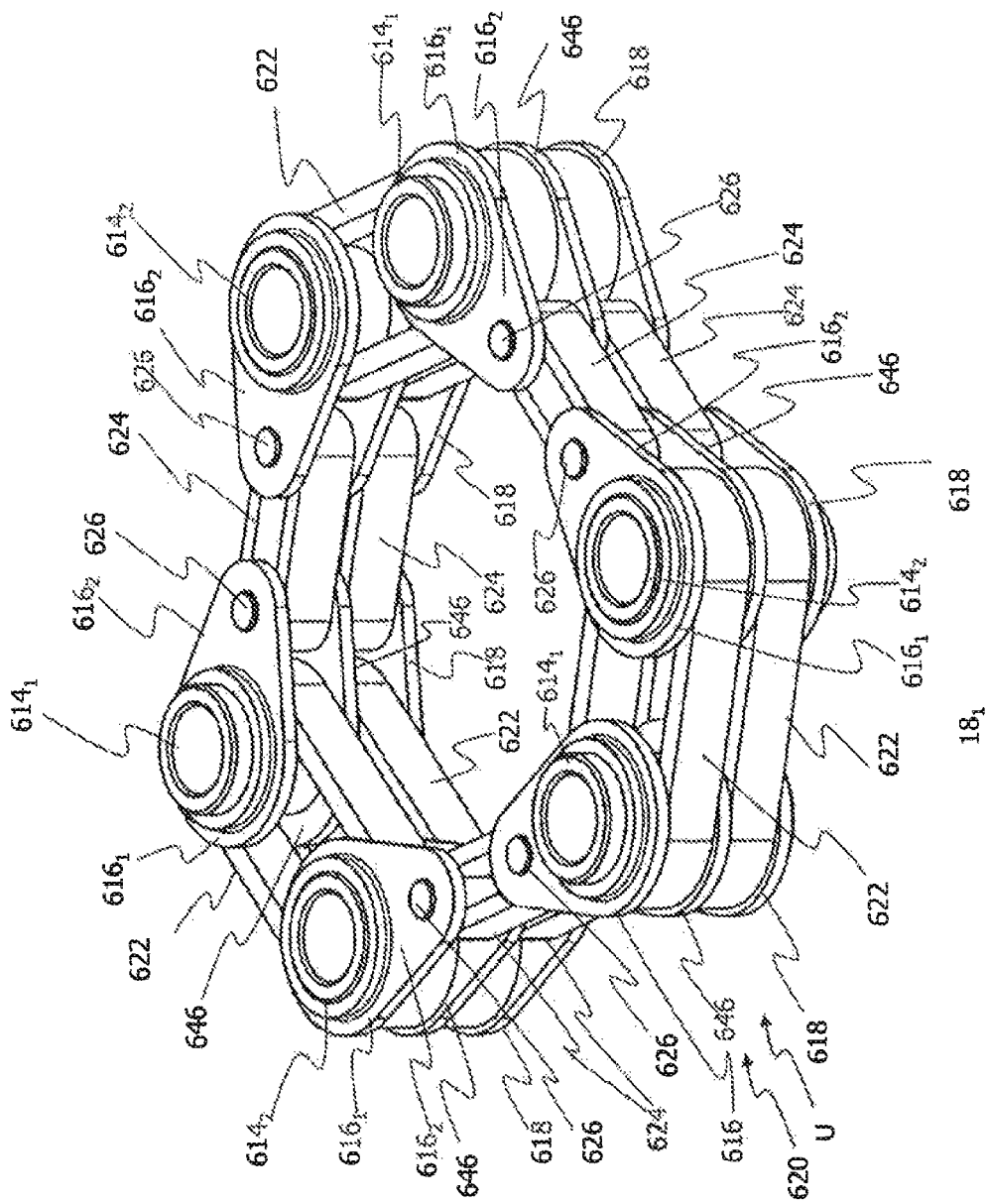
FIG. 33 shows a perspective view of a basic element of the coupling element according to the seventh embodiment of the invention.

FIG. 33 shows a perspective view of a basic element of the coupling element 610. The support arrangement 620 according to this embodiment is made up of the flange elements 616 and 618 with an intermediate element 646 being provided between the flange elements 616 and 618. The intermediate element 646 is designed in the form of an intermediate disk and serves to separate the two primary loop bundles 622 and to separate the two secondary loop bundles 624 in the wrap region U and/or in a region in which the secondary loop bundles 624 are wrapped around the bolts 626. The intermediate disks 646 prevent, among other things, the primary loop bundles 622 from rubbing against one another in the wrap region U in the load state of the coupling element 610 or having any mutual negative effects. The intermediate disks 646 are in contact with the flange elements 616 and 618 by way of the bolts 626 and are also arranged on the bushings 614₁ and 614₂.

As can be seen in FIG. 33, the two primary loop bundles 622 are each offset relative to one another in the axial direction and are each wrapped around the bushing in the wrap region U. The two secondary loop bundles 624 are also arranged offset in the axial direction on the support arrangement 620.

FIG. 34 shows a top view of the elastic coupling element 610.

Figure 35:
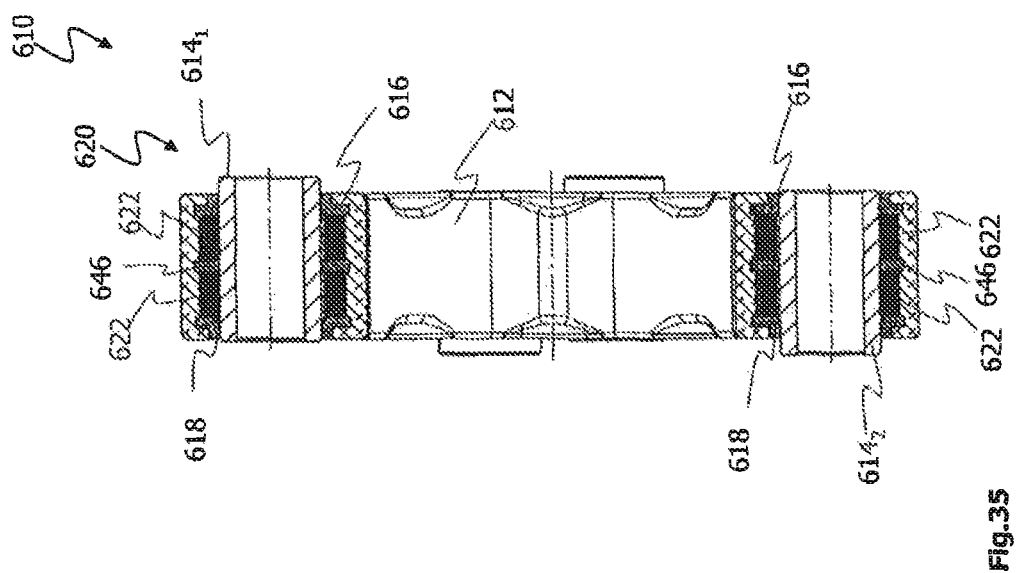
FIG. 35 shows a sectional view along the sectional line XXXV-XXXV in FIG. 34.

FIG. 35 shows a sectional view along the sectional line XXXV-XXXV in FIG. 34. The loop bundles 622, which are separated from one another by the intermediate elements 646, can be seen in FIG. 35. According to this embodiment, the support arrangement 620 is comprised of the flange element 616, the intermediate disk 646 and the flange element 618, wherein a primary loop bundle 622 is arranged between the flange element 616 and the intermediate disk 646 and between the intermediate element 646 and the flange element 618.

Figure 36:
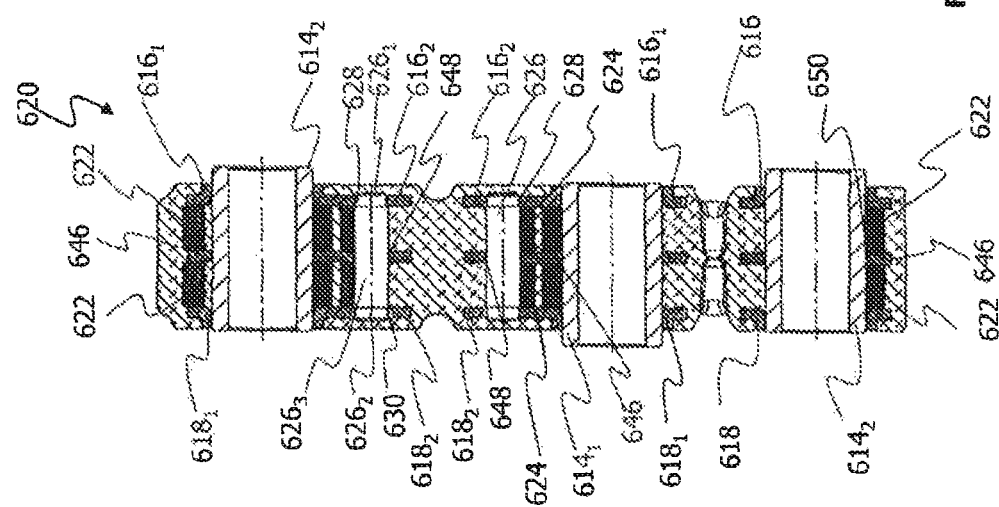
FIG. 36 shows a sectional view along the sectional line XXXVI-XXXVI in FIG. 34.

FIG. 36 shows a sectional view along the sectional line XXXVI-XXXVI in FIG. 34.

The bolts 626 for fastening the secondary loop bundles 624 on the support arrangement 620 also extend through an opening 648 in the intermediate element 646 and are held in some sections in the opening 648. The intermediate elements 646 also have openings 650 for fastening onto the bushings 614₁ and 614₂.

Figure 37:
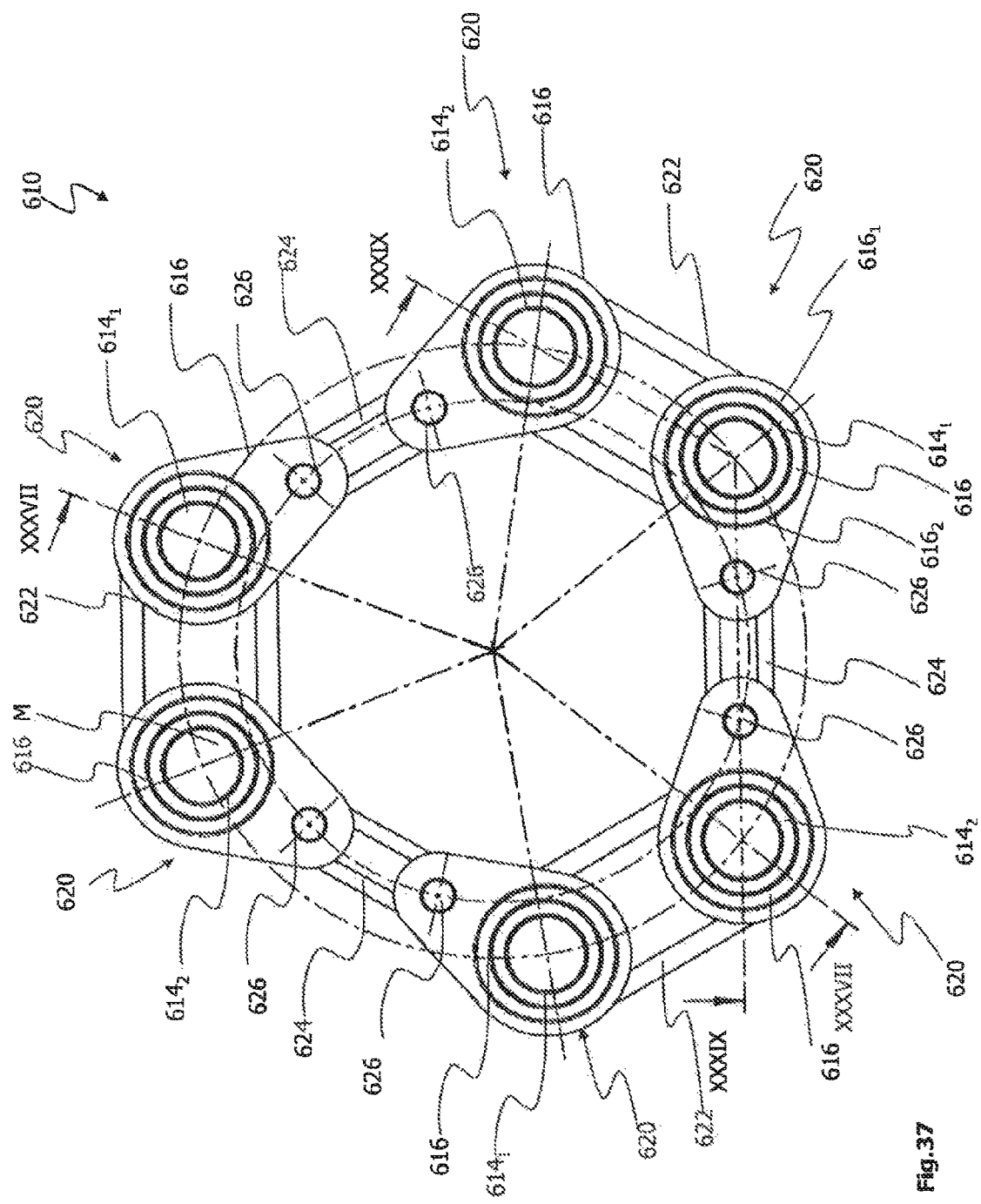
FIG. 37 shows a top view of the basic element according to FIG. 33.

FIG. 37 shows a top view of the basic element of the coupling element 610.

In this top view, it can be seen the primary loop bundles 622 and the secondary loop bundles 624. The primary loop bundles 622 are each wrapped around a bushing pair 614₁ and 614₂. The secondary loop bundles 624 are mounted on the support arrangement 620 by means of the bolts 626. The bushing pairs 614₁ and 614₂, around which a primary loop bundle 622 is wrapped are connected to a neighboring primary loop bundle 622 by means of the secondary loop bundles 624 and the support arrangements 620.

FIG. 38 shows a sectional view along the sectional line XXXVIII-XXXVIII in FIG. 37.

In the sectional view according FIG. 38, the intermediate disks 646 can again be seen, separating the two primary loop bundles 622 from one another. FIG. 39 shows a sectional view along the sectional line XXXIX-XXXIX in FIG. 37.

The secondary loop bundles 624 are secured on the flange elements 616, 618 and the intermediate elements 646 by means of the bolts 626. As is the case with the flange elements 616 and 618, the intermediate disks 646 have a section for receiving the bolts 626 through the opening 648 and a fastening section with the opening 650 for fastening on the bushings 614₁ and 614₂.

Figure 40:
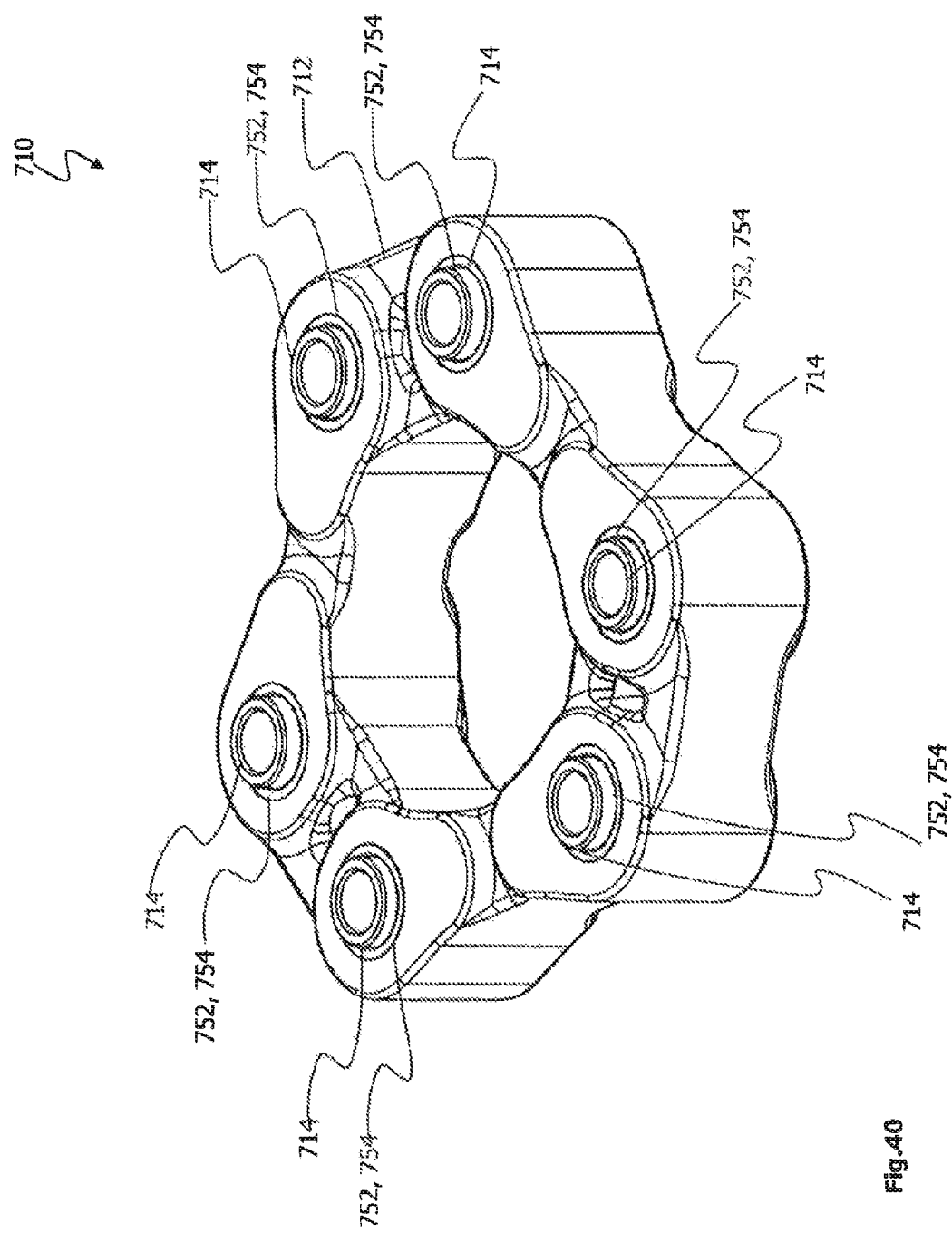
FIG. 40 shows a perspective view of the coupling element according to the eighth embodiment of the invention.

FIG. 40 shows a perspective view of a flexible coupling element 710 according to an eighth embodiment.

Bushings 714, which are held in the outer bushings 752, can be seen in FIG. 40. Only the curved end sections 754 of the outer bushings 752 can be seen in FIG. 40.

Figure 41:
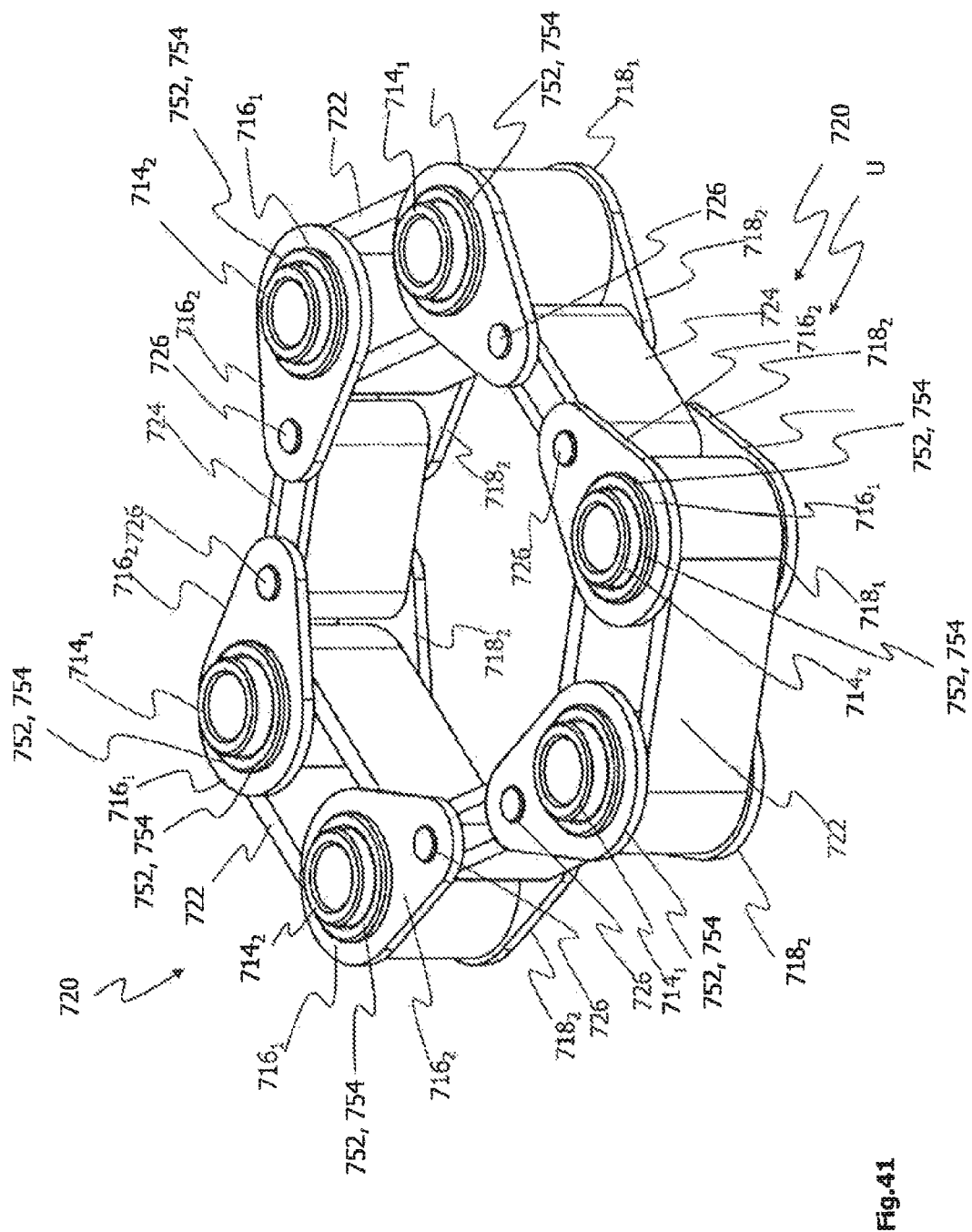
FIG. 41 shows a perspective view of a basic element of the coupling element according to the eighth embodiment of the invention.

FIG. 41 shows a perspective view of the basic element of the elastic coupling element 710.

The outer bushings 752 with their curved end sections 754 can be seen in FIG. 41. The bushings 714₁ and 714₂ are held in the outer bushings 752. Due to the curved edges 754 of the outer bushings 752 the flange elements 716, 718 are secured on the outer bushings 752 and thus also on the bushings 714₁ and 714₂ that are pressed in place. In this way, the flange elements 716 and 718 are held in position so that the primary loop bundles 722 and the secondary loop bundles 724 are held on their ideal cross section.

FIG. 42 shows a top view of the elastic coupling element 710 in which the bushings 714₁ and 714₂ can be seen with the outer bushing 752 arranged thereon.

FIG. 43 shows a sectional view along the sectional line XLIII-XLIII in FIG. 42.

Outer bushings 752 with their curved end sections 754 can be seen on the bushings 714$_1$ and 714$_2$ in FIG. 43. The end sections 754 are curved outward in the radial direction relative to the axes M of the bushings 714$_1$, 714$_2$ and are in contact with the flange elements 716, 718. The flange elements 716,718 are therefore secured on the outer bushings 752 in the axial direction and thus indirectly also on the bushings 714$_1$, 714$_2$.

FIG. 44 shows a sectional view along the sectional line XLIV-XLIV in FIG. 42.

It can also be seen in FIG. 42 that the curved and/or flanged end sections 754 of the outer bushings 752 secure the flange elements 716, 718, which are designed in the form of disks on the outer bushing 752 and thus indirectly also on the bushings 714$_1$ and 714$_2$.

Figure 45:
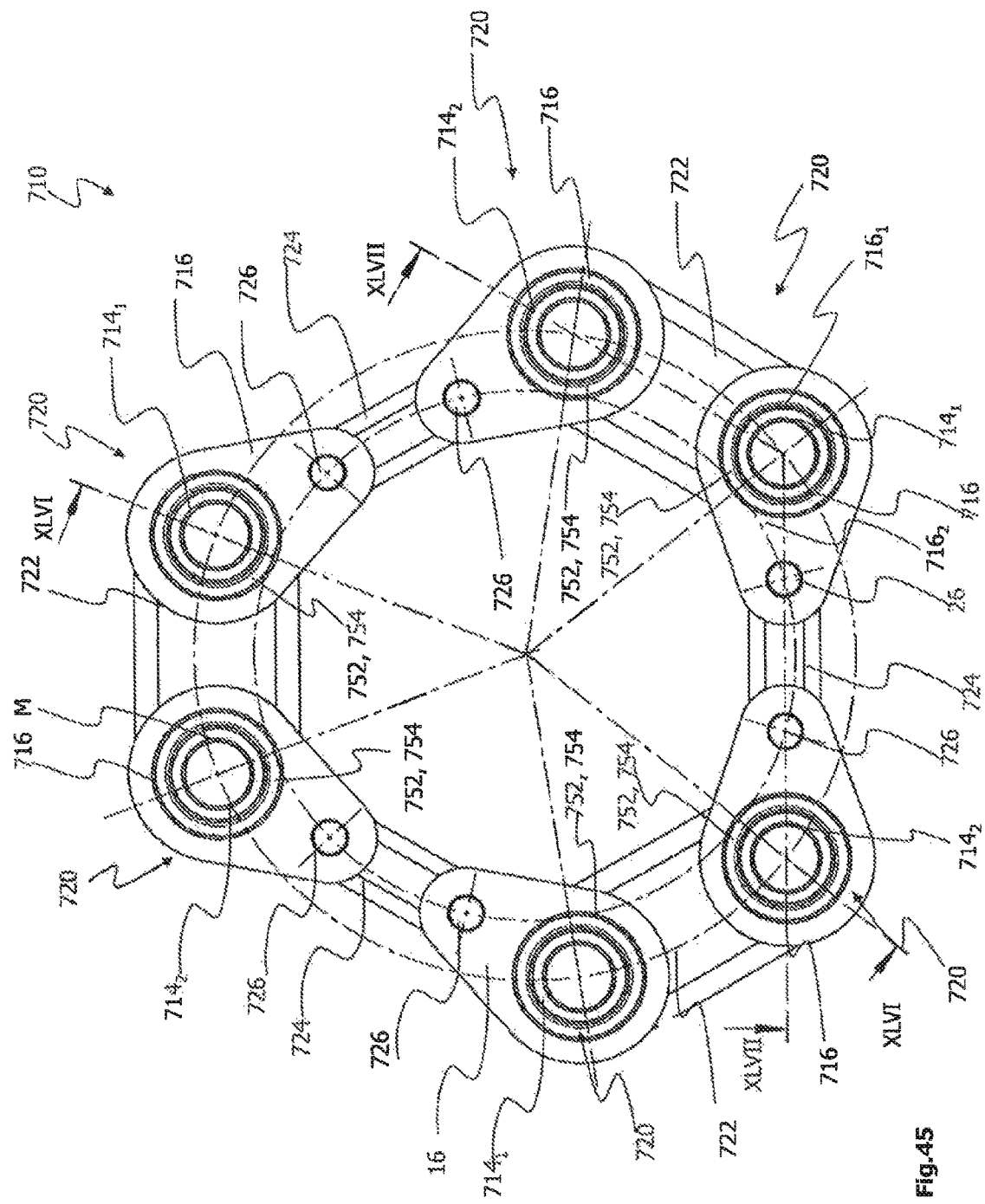
FIG. 45 shows a top view of the basic element according to FIG. 41.

FIG. 45 shows a top view of the basic element of the elastic coupling element 710.

The outer bushings 752 are in contact with the flange elements 716, 718 at their curved end sections 754.

FIG. 46 shows a sectional view along the sectional line XLVI-XLVI in FIG. 45.

FIG. 47 shows a sectional view along the sectional line XLVII-XLVII in FIG. 45.

The two sectional views according to FIGS. 46 and 47 show the outer bushings 752 with their flanged end sections 754 which are in contact with the flange elements 716, 718 to secure the flange elements 716, 718 on the outer bushings 752 and thus indirectly also on the bushings 714$_1$ and 714$_2$. Due to the end sections 754, which are curved in the radial direction, it is possible to prevent the flange elements 716 from coming loose from the bushings 714 and/or being able to migrate along the bushings 714 in the case of a load on the coupling element 710. The lifetime of the coupling elements 710 can be further improved due to this additional fastening with the curved end sections 754.

FIG. 48 shows a top view of a flexible coupling element 810 according to a ninth embodiment.

In the top view according to FIG. 48 the bushings 814$_1$ and 814$_2$ can be seen. The flange elements 816 are arranged on the bushings 814$_1$ and 814$_2$.

FIG. 49 shows a sectional view along the sectional line XLVIII-XLVIII in FIG. 48.

FIG. 49 shows the bushings 814$_1$, 814$_2$ as well as the flange elements 816 and 818 arranged on the bushings 814$_1$, 814$_2$. The flange elements 816, 818 are interconnected by means of a bolt 826. The secondary loop bundles 824 are wrapped around two neighboring bolts 826. The bushings 814$_1$, 814$_2$ have a primary loop bundle 822 wrapped around them. The flange elements 816, 818 according to this embodiment have sections 856 and 858 provided with predetermined radii. The section 856 is situated in the region of an outer edge of the fastening section 816$_1$, 818$_1$ of the flange elements 816, 818, overlapping with the cross section of the primary loop bundle 822 in the radical direction. Another predetermined radius is situated at the edge 858 which surrounds the opening to receive the bushings 814$_1$, 814$_2$ in the fastening sections 816$_1$, 818$_1$. The rounded regions 856, 858 serve to protect the loops during operation of the coupling element 810, i.e., when the coupling element 810 must compensate, for example, for an angle offset between two shafts that are to be connected. The primary loop bundles 822 are protected accordingly due to the predetermined radii.

FIG. 50 shows an enlarged detail view of a detail L in FIG. 49.

FIG. 50 shows the flange element 816 with its holding section 816$_1$ and its fastening section 816$_2$. The holding section 816$_1$ serves to hold the bushings 814$_1$ and 814$_2$. The fastening section 816$_2$ serves to fasten the secondary loop bundles 824 on the support arrangement U by means of the bolts 826. The edge 858, which encloses the receiving opening for the bushing 814$_2$ was provided with a determined radius R$_2$. The outer edge 856 was provided with a predetermined radius R$_1$. If a bending angle is forced on the coupling element 810 during operation, the coupling element 816 can "roll" over the radii R$_1$, R$_2$ on the primary loop bundle 822 without damaging the primary loop bundle 822.

FIG. 51 shows a top view of the flange element 816 with its receiving section 816$_1$ and its fastening section 816$_2$. The opening 828 to receive the bolts 826 (FIG. 50) is provided in the fastening section 816$_2$.

FIG. 52 shows a sectional view along the sectional line LII-LII in FIG. 51.

The radii R$_1$ and R$_2$ which serve to protect the loop bundle can be discerned on the edges 856 and 858.

In its various embodiments the invention is making use of the fact that such coupling disks are exposed to high tensile forces only in certain regions. The primary loop bundles and/or primary loop bundles are arranged in these high-loaded regions and thus in the individual case, in which the articulated disk is arranged between two s shaft segments, for example, permitting a reliable transfer of very high tensile forces within the context of a transfer of torque from the one shaft section to the other. However, secondary loop bundles and/or secondary loop bundles are arranged in regions, which are at any rate exposed to low tensile forces during normal operation. Accordingly, these secondary loop bundles and/or secondary loop bundles may be designed to be weaker on the whole and to save more space, so that substantial installation space savings can be achieved with the overall concept of such coupling disks. This is to the benefit of even smaller components in modern automotive engineering.

The invention claimed is:

1. An elastic coupling element for a shaft arrangement for articulated coupling of two shaft sections, comprising
   a plurality of bushings,
   at least one primary loop bundle and at least one secondary loop bundle,
   at least one support arrangement arranged on at least one bushing for axial guidance of the at least one primary loop bundle, and
   an elastic cover in which the at least one primary loop bundle, the at least one support arrangement and the plurality of bushings are embedded at least partially,
   wherein the at least one primary loop bundle is wrapped around first and second neighboring bushings to form a first bushing pair, wherein the at least one support arrangement has at least one flange element, wherein the at least one support arrangement has at least one fastening means, wherein the at least one fastening means is a bolt held in an opening in the at least one flange element, wherein the at least one flange element encloses the cross section of the at least one primary loop bundle as well as the cross section of the at least one secondary loop bundle, wherein the at least one primary loop bundle and the at least one secondary loop bundle are arranged in alternation in the circumferential direction of the coupling element.

2. The elastic coupling element according to claim 1, wherein the at least one primary loop bundle and the at least one secondary loop bundle are aligned planarly in the radial direction of the coupling element.

3. The elastic coupling element according to claim 1, wherein the at least one flange element is in contact with the at least one primary loop bundle.

4. The elastic coupling element according to claim 1, wherein the at least one secondary loop bundle is secured on the at least one flange element by means of the at least fastening means.

5. The elastic coupling element according to claim 1, wherein the at least one secondary loop bundle is wrapped around the at least one fastening means.

6. The elastic coupling element according to claim 1, wherein the at least one flange element has one fastening section for fastening the at least one secondary loop bundle by means of the at least one fastening means.

7. The elastic coupling element according to claim 1, wherein a second primary loop bundle is wrapped around third and fourth neighboring bushings to form a second bushing pair, wherein the first and second bushing pairs are interconnected by means of the at least one secondary loop bundle.

8. The elastic coupling element according to claim 7, wherein no primary loop bundle extends between the first and second bushing pairs interconnected by means of the at least one secondary loop bundle.

9. The elastic coupling element according to claim 1, wherein the first and second bushings are offset relative to one another by a predetermined angle.

10. The elastic coupling element according to claim 1, wherein the at least one support arrangement has at least one intermediate element.

11. The elastic coupling element according to claim 10, wherein the at least one intermediate element is connected to the at least one flange element by means of the at least one fastening means.

12. The elastic coupling element according to claim 1, wherein the at least one support arrangement is connected to at least one outer bushing.

13. The elastic coupling element according to claim 12, wherein the outer bushing is subjected to plastic deformation to produce a connection to the at least one support arrangement.

14. A shaft arrangement, comprising:
an automotive drive train having two shaft sections; and
an elastic coupling element for articulated coupling of the two shaft sections, comprising
a plurality of bushings,
at least one primary loop bundle and at least one secondary loop bundle,
at least one support arrangement arranged on at least one bushing for axial guidance of the at least one primary loop bundle, and
an elastic cover in which the at least one primary loop bundle, the at least one support arrangement and the plurality of bushings are embedded at least partially,
wherein the at least one primary loop bundle is wrapped around first and second neighboring bushings to form a first bushing pair, wherein the at least one support arrangement has at least one flange element, wherein the at least one support arrangement has at least one fastening means, wherein the at least one fastening means is a bolt held in an opening in the at least one flange element, wherein the at least one flange element encloses the cross section of the at least one primary loop bundle as well as the cross section of the at least one secondary loop bundle, wherein the at least one primary loop bundle and the at least one secondary loop bundle are arranged in alternation in the circumferential direction of the coupling element.

\* \* \* \* \*